(12) United States Patent  
Yoshio et al.

(10) Patent No.: US 7,916,333 B2  
(45) Date of Patent: Mar. 29, 2011

(54) READ-IMAGE TRANSFER APPARATUS AND METHOD, READ-IMAGE TRANSFER SYSTEM, COMPUTER PROGRAM, SHEET, AND CARRIER SHEET

(75) Inventors: Hitoshi Yoshio, Ishikawa (JP); Norikazu Matsuyama, Ishikawa (JP); Tsutomu Takabatake, Ishikawa (JP); Tomohisa Maeda, Ishikawa (JP)

(73) Assignee: PFU Limited, Ishikawa (JP)

( * ) Notice: Subject to any disclaimer, the term of this patent is extended or adjusted under 35 U.S.C. 154(b) by 774 days.

(21) Appl. No.: 11/955,924

(22) Filed: Dec. 13, 2007

(65) Prior Publication Data

US 2008/0204827 A1 Aug. 28, 2008

(30) Foreign Application Priority Data

Feb. 22, 2007 (JP) .................................. 2007-042234  
Apr. 16, 2007 (JP) .................................. 2007-107352

(51) Int. Cl.
  *G06F 3/12* (2006.01)
  *H04N 1/32* (2006.01)
  *G06K 15/00* (2006.01)

(52) U.S. Cl. ..................... 358/1.15; 358/1.18; 358/468

(58) Field of Classification Search ................. 358/1.15, 358/468, 1.18, 400, 404, 444, 471, 474, 434, 358/435, 436

See application file for complete search history.

(56) References Cited

U.S. PATENT DOCUMENTS

| | | | | |
|---|---|---|---|---|
| 5,845,076 A * | 12/1998 | Arakawa | ...................... | 709/203 |
| 6,188,807 B1 * | 2/2001 | Arakawa | ...................... | 382/319 |
| 6,425,001 B2 * | 7/2002 | Lo et al. | ...................... | 709/217 |
| 7,113,304 B2 * | 9/2006 | Iida | ...................... | 358/1.15 |
| 7,117,259 B1 * | 10/2006 | Rohwer | ...................... | 709/223 |
| 2006/0136566 A1 * | 6/2006 | Ohara et al. | ................... | 709/217 |
| 2007/0002050 A1 * | 1/2007 | Aoki et al. | .................... | 345/428 |
| 2008/0022290 A1 * | 1/2008 | Ochiai et al. | ................... | 719/315 |
| 2008/0040265 A1 * | 2/2008 | Rackley, III et al. | ........... | 705/40 |

FOREIGN PATENT DOCUMENTS

JP  08-256241 A  10/1996  
JP  2006-245981 A  9/2006

* cited by examiner

*Primary Examiner* — Jerome Grant, II  
(74) *Attorney, Agent, or Firm* — Lowe, Hauptman, Ham & Berner, LLP

(57) ABSTRACT

A read-image transfer apparatus is connected to an image reader and to a weblog server via a network. The read-image transfer apparatus stores therein user setting information including at least destination address information for the weblog server, a transfer protocol for the weblog server, and user identification information for causing the weblog server to identify a user. The read-image transfer apparatus controls the image reader so as to read image information from a document, stores the read image information in a memory, and transfers the stored image information to the weblog server based on the stored user setting information.

38 Claims, 14 Drawing Sheets

FIG.11

OPTION SETTINGS

- CATEGORY: [RECOMMENDED SITES ▼] — ME-1, ME-2
- ARTICLE STATUS: [PUBLISH RIGHT NOW ▼] [2005/12/27 11:27:00] — ME-3
- COMMENT: [ACCEPT ▼] — ME-4
- TRACKBACK: [ACCEPT ▼] — ME-5
- TRACKBACK TARGET URL: [ ] — ME-6

OPERATING ENVIRONMENT SETTINGS

BLOG SETTINGS
- DESTINATION: [https://app.xxxxxxx/t/app/weblog/manage] — MF-1
- USER ID INFORMATION: [maeda] — MF-2
- PASSWORD: [********] — MF-3
- BLOG TYPE: [Movable type ▼] — MF-4
- [SELF-DIAGNOSIS] — MF-5

SPECIFICATIONS FOR ARTICLES TO BE POSTED
- TITLE: [AUTOMATIC SETTING BY OCR ▼] — MF-6
- CATEGORY: [POEM OF HYDRANGEA ▼] [ADD AND DELETE] — MF-7, MF-8
- PUBLISH/NOT PUBLISH: ⊙ PUBLISH ○ NOT PUBLISH — MF-9
- COMMENT: ⊙ ACCEPT ○ NOT ACCEPT — MF-10
- TRACKBACK: ⊙ ACCEPT ○ NOT ACCEPT — MF-11
- EXPIRATION DATE: ☐ VALID UNTIL [▼] DATE [▼] MONTH [▼] YEAR — MF-12

[OK] [CANCEL] — MF-13, MF-14

SHEET

SHEET

112
IMAGE READER

IMAGE
INFORMATION

DESTINATION ADDRESS
INFORMATION, ETC.

READ-IMAGE TRANSFER APPARATUS AND METHOD, READ-IMAGE TRANSFER SYSTEM, COMPUTER PROGRAM, SHEET, AND CARRIER SHEET

RELATED APPLICATIONS

The present application is based on, and claims priority from, Japanese Application No. 2007-042234, filed Feb. 22, 2007, and Japanese Application No. 2007-107352, filed Apr. 16, 2007, the disclosures of which are hereby incorporated by reference herein in their entirety.

BACKGROUND OF THE INVENTION

1. Field of the Invention

The present invention relates to a technology for transferring an image read by an image reader to a weblog server.

2. Description of the Related Art

Weblogs are becoming widely used through World Wide Web (WWW) in recent years. The weblog usually includes a browser interface through which a user posts an article, creates a category, updates content, and do the like.

In general, it is difficult for users who are unfamiliar with operating a computer such as keyboard entry and mouse entry to post articles on weblogs, update contents, and do the like.

To post an article or the like on a weblog, the following operation procedure is usually required in addition to connection to the Internet, such as (1) start of a browser, (2) entry of Uniform Resource Locator (URL), (3) entry of a user name and password, and (4) entry of an article. And this operation procedure is also troublesome for users who are familiar with operating a computer.

In the case of weblogs, as compared with ordinary Web pages, methods of posing articles and methods of registering image data are different depending on weblog services and weblog systems. Therefore, some knowledge for differences in the methods of posting and the methods of registration are required for a user to freely select a weblog and post an article on the weblog.

When the user wants to post an image of a paper document or the like on a weblog, the image has to be digitized. However, it is complicated to take information for an image captured by a digital camera or the like into an information processor such as a computer, and to post the image information.

There is a device described in Japanese Patent Application Laid-Open No. 2006-245981 as a technology capable of easily registering image information on a weblog. The device is a communication device that controls so as to register image information received by a facsimile receiving function on a weblog.

There is also a medium described in Japanese Patent Application Laid-Open No. H08-256241 as a literature on a medium for causing a reader to read an image. The medium is a carrier sheet formed with two sheets such as a transparent sheet and a backing sheet to carrier a document.

The communication device as one of the conventional technologies essentially requires a facsimile device and a facsimile line. The communication device registers image information received by the facsimile device on a previously registered weblog using a particular markup language and a specific communication protocol. Therefore, the image formation for a document freely created by a user cannot be registered on an arbitrary weblog.

Referring to the medium as the other one of the conventional technologies, there are no ideas on how to register the read image information on a weblog although the medium can be used to carry a document.

SUMMARY OF THE INVENTION

It is an object of the present invention to at least partially solve the problems in the conventional technology.

According to one aspect of the present invention, a read-image transfer apparatus is connected to an image reader and to a weblog server via a network, and includes a memory, and a controller. In the read-image transfer apparatus, the memory includes a user-setting-information storage unit that stores therein user setting information including at least destination address information for the weblog server, a transfer protocol for the weblog server, and user identification information for causing the weblog server to identify a user, and the controller includes an image reading unit that controls the image reader so as to read image information from a document, a read-image storing unit that stores the read image information in the memory, and an image transferring unit that transfers the image information stored by the read-image storing unit to the weblog server, based on the user setting information stored in the user-setting-information storage unit.

According to another aspect of the present invention, a read-image transfer system includes a read-image transfer apparatus that is connected to an image reader and that includes a memory and a controller, an information communication terminal that includes a memory, a controller, a display unit, and an input unit, and a weblog server, all of which being communicably connected to each other via a network to form the read-image transfer system. In the read-image transfer system, the memory of the read-image transfer apparatus includes a user-setting-information storage unit that stores therein at least destination address information for the weblog server, a transfer protocol for the weblog server, and user identification information for causing the weblog server to identify a user, and the controller of the read-image transfer apparatus includes an image reading unit that controls the image reader so as to read image information from a document, a read-image storing unit that stores the read image information in the memory of the read-image transfer apparatus, an email-with-image sending unit that sends an email with the image information stored by the read-image storing unit to the information communication terminal, and an image transferring unit that transfers the image information stored by the read-image storing unit, to the weblog server based on the user setting information stored in the user-setting-information storage unit. And the controller of the information communication terminal includes a read-image displaying unit that causes the display unit of the information communication terminal to display thereon the image information sent by the email-with-image sending unit, a posting confirming unit that prompts the user to enter an instruction whether the image information transferred by the image transferring unit corresponding to the displayed image information is to be posted on a weblog, through the input unit, and a posting-instruction transmitting unit that transmits posting instruction information to the weblog server, when the posting confirming unit confirms that the instruction to post the image information is entered by the user, the posting instruction information being used to control the weblog server so that the transferred image information is posted on the weblog.

According to still another aspect of the present invention, a read-image transfer system includes a read-image transfer apparatus that is connected to an image reader and that includes a memory and a controller, an information communication terminal that includes a memory, a controller, a display unit, and an input unit, and a weblog server, all of which being communicably connected to each other via a network to form the read-image transfer system. In the read-image transfer system, the controller of the read-image transfer apparatus includes an image reading unit that controls the image reader so as to read image information from a document, a read-image storing unit that stores the read image information in the memory of the read-image transfer apparatus, and an email-with-image sending unit that sends an email with the stored image information to the information communication terminal. The memory of the information communication terminal includes a user-setting-information storage unit that stores therein user setting information including at least destination address information for the weblog server, a transfer protocol for the weblog server, and user identification information for causing the weblog server to identify a user, and the controller of the information communication terminal includes a read-image displaying unit that causes the display unit of the information communication terminal to display thereon the image information sent by the email-with-image sending unit, a transfer confirming unit that prompts the user to enter an instruction whether displayed image information is to be transferred to the weblog server, through the input unit, and an image transferring unit that transfers the image information stored by the read-image storing unit to the weblog server, when the transfer confirming unit confirms that the instruction to transfer the image information is entered by the user, based on the user setting information stored in the user-setting-information storage unit.

According to still another aspect of the present invention, a read-image transfer method is executed in a read-image transfer apparatus that is connected to an image reader and to a weblog server via a network and that includes a memory and a controller, the memory includes a user-setting-information storage unit that stores therein user setting information including at least destination address information for the weblog server, a transfer protocol for the weblog server, and user identification information for causing the weblog server to identify a user. The read-image transfer method executed in the controller includes an image reading step of reading image information from a document by controlling the image reader, a read-image storing step of storing the read image information in the memory, and an image transferring step of transferring the image information stored at the read-image storing step to the weblog server based on the user setting information stored in the user-setting-information storage unit.

According to still another aspect of the present invention, a read-image transfer method is executed in a read-image transfer system that includes a read-image transfer apparatus that is connected to an image reader and includes a memory and a controller and an information communication terminal that includes a memory, a controller, a display unit, and an input unit, both of which being connected to a weblog server via a network to form the read-image transfer system. The memory of the read-image transfer apparatus includes a user-setting-information storage unit that stores therein user setting information including at least destination address information for the weblog server, a transfer protocol for the weblog server, and user identification information for causing the weblog server to identify a user. The read-image transfer method executed in the controller of the read-image transfer apparatus includes a image reading step of reading image information from a document by controlling the image reader, a read-image storing step of storing the read image information in the memory of the read-image transfer apparatus, a email-with-image sending step of sending an email with the stored image information to the information communication terminal, and a image transferring step of transferring the stored image information to the weblog server based on the user setting information stored in the user-setting-information storage unit. The read-image transfer method executed in the controller of the information communication terminal includes a read-image displaying step of controlling the display unit of the information communication terminal so as to display thereon the image information sent at the email-with-image sending step, a posting confirming step of prompting the user to enter an instruction whether the transferred image information corresponding to the displayed image information is to be posted on the weblog, through the input unit, and a posting-instruction transmitting step of transmitting posting instruction information to the weblog server, when it is confirmed that the instruction to post the image information is entered by the user at the posting confirming step, the posting instruction information being used to control the weblog server so that the transferred image information is posted on the weblog.

According to still another aspect of the present invention, a read-image transfer method is executed in a read-image transfer system that includes a read-image transfer apparatus that is connected to an image reader and includes a memory and a controller, and an information communication terminal that includes a memory, a controller, a display unit, and an input unit, both of which being connected to a weblog server via a network to form the read-image transfer system. The memory of the information communication terminal includes a user-setting-information storage unit that stores therein user setting information including at least destination address information for the weblog server, a transfer protocol for the weblog server, and user identification information for causing the weblog server to identify a user. The read-image transfer method executed in the controller of the read-image transfer apparatus includes an image reading step of reading image information from a document by controlling the image reader, a read-image storing step of storing the read image information in the memory of the read-image transfer apparatus, an email-with-image sending step of sending an email with the stored image information to the information communication terminal. The controller of the information communication terminal includes a read-image displaying step of causing the display unit of the information communication terminal to display thereon the image information sent at the email-with-image sending step, a transfer confirming step of prompting the user to enter an instruction whether the displayed image information is to be transferred to the weblog server, through the input unit, and an image transferring step of transferring the image information stored at the read-image storing step to the weblog server, when it is confirmed that the instruction to transfer the image information is entered by the user at the transfer confirming step, based on the user setting information stored in the user-setting-information storage unit.

According to still another aspect of the present invention, a computer-readable recording medium stores therein a computer program causing a read-image transfer apparatus to execute a read-image transfer method. The read-image transfer apparatus is connected to an image reader and to a weblog server via a network, and includes a memory and a controller. The memory includes a user-setting-information storage unit that stores therein user setting information including at least destination address information for the weblog server, a transfer protocol for the weblog server, and user identification information for causing the weblog server to identify a user.

The read-image transfer method executed in the controller includes an image reading step of controlling the image reader so as to read image information from a document, a read-image storing step of storing the read image information in the memory, and an image transferring step of transferring the image information stored at the read-image storing step to the weblog server, based on the user setting information stored in the user-setting-information storage unit.

According to still another aspect of the present invention, a sheet causes a read-image transfer apparatus connected a weblog server via a network to read image information through an image reader. In the sheet, at least one of destination address information for the weblog server, a transfer protocol for the weblog server, and user identification information for causing the weblog server to identify a user is provided on the sheet so as to be read by the read-image transfer apparatus.

According to still another aspect of the present invention, a sheet causes a read-image transfer apparatus connected a weblog server via a network to read image information through an image reader provided with a radio communication unit. The sheet includes a memory transmission unit that stores therein at least one of destination address information for the weblog server, a transfer protocol for the weblog server, and user identification information for causing the weblog server to identify a user, and transmits at least one of the stored information to the read-image transfer apparatus via the radio communication unit.

According to still another aspect of the present invention, a carrier sheet carries a document to an image reader to cause a read-image transfer apparatus connected a weblog server via a network to read image information from the document through the image reader. The carrier sheet includes a transparent sheet, and a backing sheet. In the carrier sheet, at least one sides of the transparent sheet and the backing sheet are fixed so that the document is capable of being inserted between the transparent sheet and the backing sheet, and at least one of destination address information for the weblog server, a transfer protocol for the weblog server, and user identification information for causing the weblog server to identify a user is provided on at least one of the transparent sheet and the backing sheet so as to be read by the read-image transfer apparatus.

According to still another aspect of the present invention, a carrier sheet carries a document to an image reader provided with a radio communication unit to cause a read-image transfer apparatus connected a weblog server via a network to read image information from the document through the image reader. The carrier sheet includes a transparent sheet, a backing sheet, wherein at least one sides of the transparent sheet and the backing sheet are fixed so that the document is capable of being inserted between the transparent sheet and the backing sheet, and a memory transmission unit that stores therein at least one of destination address information for the weblog server, a transfer protocol for the weblog server, and user identification information for causing the weblog server to identify a user, and transmits at least one of the stored information to the read-image transfer apparatus via the radio communication unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a schematic of one example of an entry screen of Posting options;

FIG. 12 is a schematic of one example of an entry screen of Operating environment settings;

DETAILED DESCRIPTION OF THE PREFERRED EMBODIMENTS

Exemplary embodiments of the present invention are explained in detail below with reference to the accompanying drawings. It is noted that the present invention is not limited by these embodiments.

Figure 1:
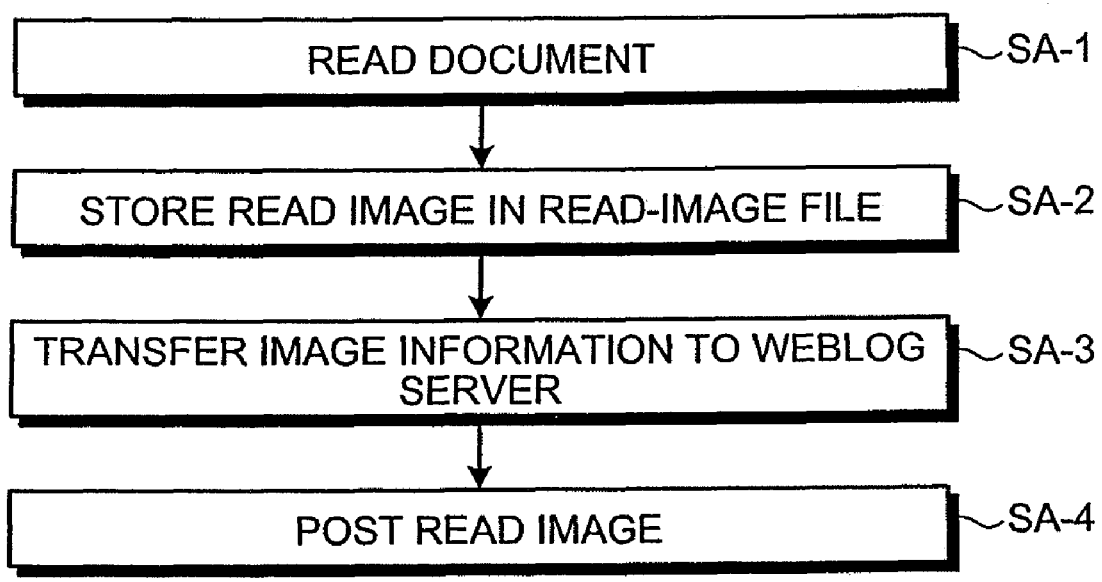
FIG. 1 is a flowchart of a basic principle of the present invention.

The overview of the present invention is explained first, and then the configuration and the processes of the present invention are explained in detail below. FIG. 1 is a flowchart of a basic principle of the present invention.

The present invention has the following basic features as its outline. More specifically, the read-image transfer apparatus according to the present invention is connected to an image reader and to a weblog server via a network. The read-image transfer apparatus includes a memory and a controller, and the memory stores therein user setting information.

The user setting information includes at least destination address information for the weblog server, a transfer protocol for the weblog server, and user identification (ID) information for causing the weblog server to identify the user.

As shown in FIG. 1, the read-image transfer apparatus controls the image reader so as to read image information from a document (step SA-1).

As a document medium, a sheet such as a paper, a film, or an overhead projector (OHP) sheet may be used. A carrier sheet may also be used. The carrier sheet is formed with a transparent sheet and a backing sheet as a medium for carrying a document to the image reader, and at least one side of the carrier sheet is fixed so that a document can be inserted between the transparent sheet and the backing sheet. Further, the sheet or the carrier sheet may be provided thereon with at least one of the destination address information, the transfer protocol, and the user ID information so as to be read by the read-image transfer apparatus. Furthermore, the sheet or the carrier sheet may also be provided thereon with a memory transmission unit (e.g., radio frequency identification (RFID)) that stores therein user setting information including at least one of the destination address information, the transfer protocol, and the user ID information, and transmits the stored information to the read-image transfer apparatus via a radio communication unit.

The read-image transfer apparatus stores the read image information in the memory (step SA-2).

The read-image transfer apparatus transfers the stored image information to the weblog server based on the stored user setting information (step SA-3).

With these steps, the read image is posted on the weblog (step SA-4). More specifically, the weblog server provides a weblog site on which the read image is posted, to the terminal connected to the weblog server via the network. The read-image transfer apparatus may store therein electronic-mail (hereinafter, "email") address information for the user in association with the user ID information, receive posting success/failure information from the weblog server, and send an email notifying the user of the posting success/failure information to the email address as a destination corresponding to the user ID information.

The "posting success/failure information" mentioned here indicates information on whether the image information is successfully posted on the weblog. Therefore, the posting success/failure information may include, for example, user ID information, posting success information, and an error code. More specifically, the error code includes an error code indicating capacity shortage of the memory in the weblog server allocated to the user, an error code indicating that the transferred image information does not coincide with a posting format of the weblog server, and an error code indicating that authentication of the user is failed based on the user ID information.

The read-image transfer apparatus may display the read image information on the display unit before it is transferred.

Upon the transfer, the read-image transfer apparatus prompts the user to enter an instruction, through an input unit, whether the displayed image information is to be transferred to the weblog server.

When the instruction that the image information is to be transferred is entered from the user, the read-image transfer apparatus transfers the image information stored in the memory to the weblog server.

Further, the read-image transfer apparatus may be configured to store therein the destination address information or the transfer protocol as environment setting information for each weblog server group, prompt the user to enter information for the weblog server through the input unit, set environment setting information corresponding to the weblog server as the user setting information based on the environment setting information, and store therein the set information.

The read-image transfer apparatus may also convert image information read through the image reader into image information so as to coincide with an image posting format of the weblog server based on image posting format information stored in the memory, and store the converted image information in the memory.

The read-image transfer apparatus may acquire "information such as character" by recognizing characters, symbols, or graphics from the read image information. In this case, the read-image transfer apparatus may edit the user setting information based on the acquired information such as character. Furthermore, the information such as character may be recognized by using an optical character reader (OCR) function.

The "information such as character" mentioned here indicates information for recognized character, symbol, or graphic, that is, information such as a bar code, a QR code or a two-dimensional bar code, a seal, and a URL.

The read-image transfer apparatus may further be connected to an integrated circuit (IC) card reader to control IC-card payment through the IC card reader, and when the payment is made by the IC card, then the read-image transfer apparatus transfers image information to the weblog server.

The read-image transfer apparatus may further be connected, via a network, to a weblog management server that includes at least a memory. The weblog management server may be configured to store therein the destination address information, the transfer protocol, or the image posting format information as basic environment setting information for each weblog server group, and the read-image transfer apparatus may be configured to reference the basic environment setting information stored in the weblog management server and update the environment setting information stored in a weblogs environment-settings storage unit.

The read-image transfer apparatus may further be connected, via a network, to an information communication terminal that includes at least a memory, a controller, a display unit, and an input unit.

Based on the configuration as above, the read-image transfer apparatus reads image information from the document through the image reader.

The read-image transfer apparatus then stores the read image information in the memory thereof.

The read-image transfer apparatus transfers the stored image information to the weblog server based on the user setting information stored in the memory. In this configuration, the read image is not yet posted on the weblog at this time.

The read-image transfer apparatus sends an email with the image information stored in a read-image file to the information communication terminal. Here the read-image transfer apparatus may further be connected to an infrared communication device, acquire user ID information and/or email address information through infrared communication performed by the infrared communication device, store therein the acquired information, and send the email with the image to the information communication terminal using the acquired email address or the stored email address corresponding to the user ID information acquired by an infrared communicating unit, as the destination.

The information communication terminal displays the sent image information attached to the email on its display unit.

The information communication terminal prompts the user to enter an instruction, through the input unit, whether the image information transferred to the weblog server corresponding to the displayed image information is to be posted on the weblog.

When the instruction to post the image information is entered from the user, the information communication terminal transmits posting instruction information to the weblog server. The posting instruction information is used to cause the weblog server to post the transferred image information on the weblog. The weblog server posts the read image on the weblog in response to reception of the posting instruction information, and provides the read image posted on the weblog.

This is the overview of the present invention when the configuration includes the information communication terminal added thereto. Here the present invention may also be configured to directly transfer the image information from the information communication terminal to the weblog server, in addition to the configuration in which the image information is transferred from the read-image transfer apparatus to the weblog server. This is the end of the explanation of the overview of the present invention.

Figure 2:
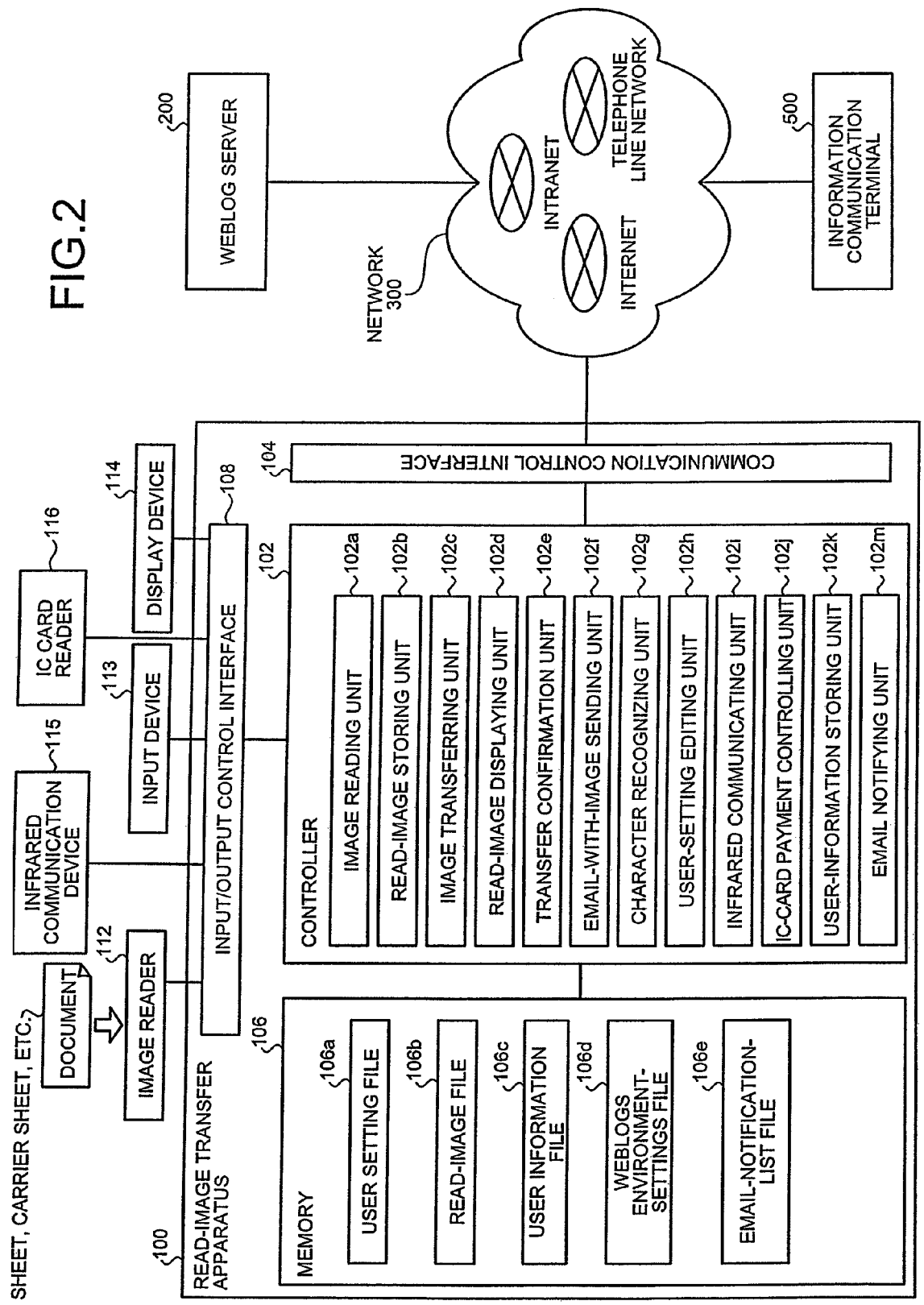
FIG. 2 is a block diagram of one example of a read-image transfer system to which the present invention is applied.

FIG. 2 is a block diagram of one example of the read-image transfer system to which the present invention is applied, and this figure conceptually shows only portions related to the present invention based on the configuration. The read-image transfer system includes a read-image transfer apparatus 100, a weblog server 200 that provides, for example, a database on weblogs, or a website such as a weblog by executing programs such as sever applications or the like, and an information communication terminal 500, all of which is communicably connected to each other via a network 300.

As shown in FIG. 2, the network 300 has a function of mutually connecting the read-image transfer apparatus 100, the weblog server 200, and the information communication terminal 500 to each other. The network 300 is, for example, the internet, a telephone line network (including a mobile phone network and a general telephone line network), and an intranet.

As shown in FIG. 2, the weblog server 200 is mutually connected to the read-image transfer apparatus 100 via the network 300, and has a function of providing, for example, a database on weblogs, or a website such as a weblog by executing programs such as sever applications or the like, to the user.

The weblog server 200 plays a role of storing information such as an extensible markup language (XML) documents and images in the database, and transmitting these pieces of information according to a request from client software such as Web browser, through the network 300. The weblog server 200 may implement a function of generating dynamic pages in which the program is executed according to the request and the result is transmitted to the client, and a function of a transaction process linked with the database.

The hardware of the weblog server 200 may be configured with an information processor such as a commercially available work station and personal computer, and with its peripherals. The functions of the weblog server 200 are implemented by a central processing unit (CPU), a disk drive, a memory device, an input device, an output device, and a communication control device in the hardware configuration of the weblog server 200, and by programs that control these devices. A plurality of weblog servers 200 may be connected to the network 300.

The read-image transfer apparatus 100 in FIG. 2 includes a controller 102 such as the CPU that integrally controls the whole of the read-image transfer apparatus 100, a communication control interface 104 connected to a communication device (not shown) such as a router connected to the communication line or the like, an input/output control interface 108, and a memory 106 that stores therein various types of databases and tables. These components are communicably connected to each other via an arbitrary communication path. Furthermore, the read-image transfer apparatus 100 is communicably connected to the network 300 via a communication device such as a router and via a wired or wireless communication line such as a dedicated line.

The various types of databases and tables (a user setting file 106*a* to an email-notification-list file 106*e*) stored in the memory 106 are storage units such as a fixed disk drive, which store therein various programs, tables, files, databases, and Web pages respectively used for processes.

Of the components in the memory 106, the user setting file 106*a* is user-setting-information storage means that stores therein user setting information including the destination address information (for example, a destination URL, an end point, an email address) for the weblog server 200, the transfer protocol for the weblog server 200, user ID information for causing the weblog server 200 to identify the user, and the like.

The user setting information stored in the user setting file 106*a* may include, for example, a connection name that defines a file name of the user setting information for each weblog based on each user, end point information that defines an end point published on the weblog, proxy information for mediating the connection between the read-image transfer apparatus 100 and the weblog server 200, and image posting format information supported by the weblog server 200. The user ID information may include password information so that the weblog server 200 authenticates the user. The end point information may include a destination address and a port number.

The read-image file 106*b* is read-image storage means that stores therein image information read from a document through the control of an image reader 112.

The user information file 106*c* is user-information storage means that stores therein user ID information and/or email address information. Here the user information file 106*c* may store therein the user ID information in association with the email address information.

The weblogs environment-settings file 106*d* is weblogs environment-settings storage means that makes a database of the destination address information, the transfer protocol, and the image posting format information supported by the weblog server 200, as environment setting information, for each group of the weblog servers 200. For example, the weblogs environment-settings file 106*d* may store therein, as the transfer protocol supported by the weblog server 200, HyperText Transfer Protocol (HTTP), Simple Email Transfer Protocol (SMTP), and Extensible Markup Language-Remote Procedure Call (XML-RPC) in association with each weblog server or each blog type. The weblogs environment-settings file 106*d* may also store therein the environment setting information in association with each blog type, or may store therein each weblog server 200 in association with each blog type.

The email-notification-list file 106*e* is email-notification-list storage means that stores therein the email address information for each user in association with user ID information. Here the email-notification-list file 106*e* may be created based on the user setting information stored in the user setting file 106*a* and the email address information stored in the user information file 106*c*. The email-notification-list file 106*e* may store therein a plurality pieces of email address information for each user in association with the user ID information.

As shown in FIG. 2, the communication control interface 104 controls communications between the read-image transfer apparatus 100 and the network 300 (or the communication device such as a router). In other words, the communication control interface 104 has a function of communicating data with other terminals via the communication line.

As shown in FIG. 2, the input/output control interface 108 is connected to the image reader 112, an input device 113, a display device 114, an infrared communication device 115, and to an IC card reader 116, and controls these devices. A keyboard, a mouse, and a microphone can be used as the input device 113. The display device 114 is, for example, a monitor (including a television for home use). A technology such as Infrared Data Association (IrDA) may be used for the infrared communication device 115. A contactless IC card technology may be used for the IC card reader 116.

As shown in FIG. 2, the image reader 112 is a device that reads image information from a document. Here the image reader 112 may include a radio communication unit. For example, the image reader 112 reads a document and, at the same time, may receive information such as the destination address information, the transfer protocol, and the user ID information from the memory transmission unit such as an RFID chip via the radio communication unit (e.g., RFID sensor (sense coil)).

The document medium is explained below. For example, as the document medium, a sheet such as a paper, a film, or an OHP sheet may be used. A carrier sheet may also be used. The carrier sheet is formed with a transparent sheet and a backing sheet as a medium for carrying a document to the image reader 112, and at least one side of the carrier sheet is fixed so that the document can be inserted between the transparent sheet and the backing sheet. Further, the sheet or the carrier sheet may be provided thereon with at least one of the destination address information, the transfer protocol, and the user ID information so as to be read by the read-image transfer apparatus 100. For example, the sheet or the carrier sheet (including the transparent sheet and the backing sheet) may also be provided thereon with a graphic such as a bar code and a two-dimensional bar code like a QR code. More specifically, the sheet or the carrier sheet may also be provided thereon with at least one of the destination address information, the transfer protocol, and the user ID information as a graphic such as a bar code and a two-dimensional bar code. Furthermore, the sheet or the carrier sheet may be provided thereon with the memory transmission unit (e.g., RFID) that stores therein at least one of the destination address information, the transfer protocol, and the user ID information, and transmits the stored information to the read-image transfer apparatus 100 via the image reader 112 that includes the radio communication unit.

As shown in FIG. 2, the controller 102 includes an internal memory that stores therein control programs for an operating system (OS), programs for defining various procedures, and required data. The controller 102 performs information processing by these programs to execute various processes. The controller 102 functionally includes an image reading unit 102a, a read-image storing unit 102b, an image transferring unit 102c, a read-image displaying unit 102d, a transfer confirming unit 102e, an email-with-image sending unit 102f, a character recognizing unit 102g, a user-setting editing unit 102h, an infrared communicating unit 102i, an IC-card payment controlling unit 102j, a user-information storing unit 102k, and an email notifying unit 102m.

Among these units, the image reading unit 102a is image reading means that causes the image reader 112 to read image information from a document. Here the image reading unit 102a may cause the image reader 112 with the radio communication unit to read at least one of the destination address information, the transfer protocol, and the user ID information from the memory transmission unit provided on the document medium (such as the sheet and the carrier sheet).

The read-image storing unit 102b is read-image storing means that stores the image information read by the image reading unit 102a in the read-image file 106b. Here the read-image storing unit 102b may store therein the read image information by being converted so as to coincide with an image posting format of the weblog server 200 based on the image posting format information stored in the user setting file 106a. The image posting format mentioned here indicates an image size and various types of image formats such as Joint Photographic Experts Group (JPEG), Graphic Image Format (GIF), and Portable Network Graphics (PNG), which are supported by the weblog server 200.

The image transferring unit 102c is image transferring means that controls the communication control interface 104 so as to transfer the image information stored in the read-image file 106b to the weblog server 200 based on the user setting information stored in the user setting file 106a. Here the image transferring unit 102c may also be configured to transfer the stored image information to the weblog server 200 when payment is made by the IC card through control of the IC-card payment controlling unit 102j.

The read-image displaying unit 102d is read-image displaying means that causes the display device 114 to display the image information read by the image reading unit 102a.

The transfer confirming unit 102e is transfer confirming means that prompts the user to enter an instruction, through the input device 113, whether the image information displayed by the read-image displaying unit 102d is to be transferred to the weblog server 200.

The email-with-image sending unit 102f is email-with-image sending means that sends an email with the image information stored in the read-image file 106b to the information communication terminal 500. Here the email-with-image sending unit 102f may send the email to the information communication terminal 500 by using, as a destination, the email address acquired by the infrared communicating unit 102i or the email address stored in the user information file 106c corresponding to the user ID information acquired by the infrared communicating unit 102i. The email-with-image sending unit 102f may also be configured to send the email with the image information stored in the read-image file 106b to the information communication terminal 500 when payment is made by the IC card through the IC-card payment controlling unit 102j.

The character recognizing unit 102g is character recognizing means that recognizes a character, a symbol, or a graphic from the image information stored in the read-image file 106b, and acquires "information such as character". Here the character recognizing unit 102g may be implemented by the OCR function. As an example, the character recognizing unit 102g recognizes a graphic such as a bar code and a two-dimensional code from the image information, and may acquire at least one of the destination address information, the transfer protocol, and the user ID information, as the information such as character.

The user-setting editing unit 102h is user-setting editing means that prompts the user to enter information for the weblog server 200 through the input device 113, sets, as the user setting information, environment setting information such as the transfer protocol, the destination address information, and the image posting format information corresponding to the entered information for the weblog server 200, based on the environment setting information stored in the weblogs environment-settings file 106d, and stores the set environment setting information in the user setting file 106a. Here the user-setting editing unit 102h may prompt the user to select a blog type (type of weblog) as information for the weblog server 200, and set the environment setting information that coincides with the blog type as the user setting information, based on the environment setting information.

Furthermore, the user-setting editing unit 102*h* may edit the user setting information stored in the user setting file 106*a* based on the information such as character acquired by the character recognizing unit 102*g*. For example, when the destination address information such as URL information is acquired as the information such as character, the user-setting editing unit 102*h* may edit the destination address information in the user setting information and store the edited information in the user setting file 106*a*. Moreover, the user-setting editing unit 102*h* may set at least one of the destination address information, the transfer protocol, and the user ID information, which are read by the image reading unit 102*a* and recognized by the character recognizing unit 102*g*, as the user setting information, and store the set information in the user setting file 106*a*.

The infrared communicating unit 102*i* is infrared communicating means that causes the infrared communication device 115 to perform infrared communication to acquire user ID information and/or email address information. Here the infrared communicating unit 102*i* may perform infrared communication with the information communication terminal 500 via an infrared communication device 515 of the information communication terminal 500.

The IC-card payment controlling unit 102*j* is IC-card payment controlling means that controls IC-card payment through the IC card reader 116. Here the IC-card payment controlling unit 102*j* may use a contactless IC card technology.

The user-information storing unit 102*k* is user-information storing means that stores the user ID information and/or the email address information acquired by the infrared communicating unit 102*i* in the user information file 106*c*.

The email notifying unit 102*m* is email notifying means that receives posting success/failure information on whether the transferred image information is successfully posted on the weblog from the weblog server 200, and sends an email notifying the user of the posting success/failure information to the email address, as a destination, that is stored in the email-notification-list file 106*e*, and that is corresponding to the user ID information. Here the email notifying unit 102*m* may be configured to receive posting success/failure information including error codes as follows in addition to the user ID information and the posting success information, and send the posting success/failure information by email. The error codes include an error code indicating capacity shortage of the memory in the weblog server 200 allocated to the user, an error code indicating that the image information does not coincide with the posting format of the weblog server 200, and an error code indicating that authentication of the user based on the user ID information is failed.

Figure 3:
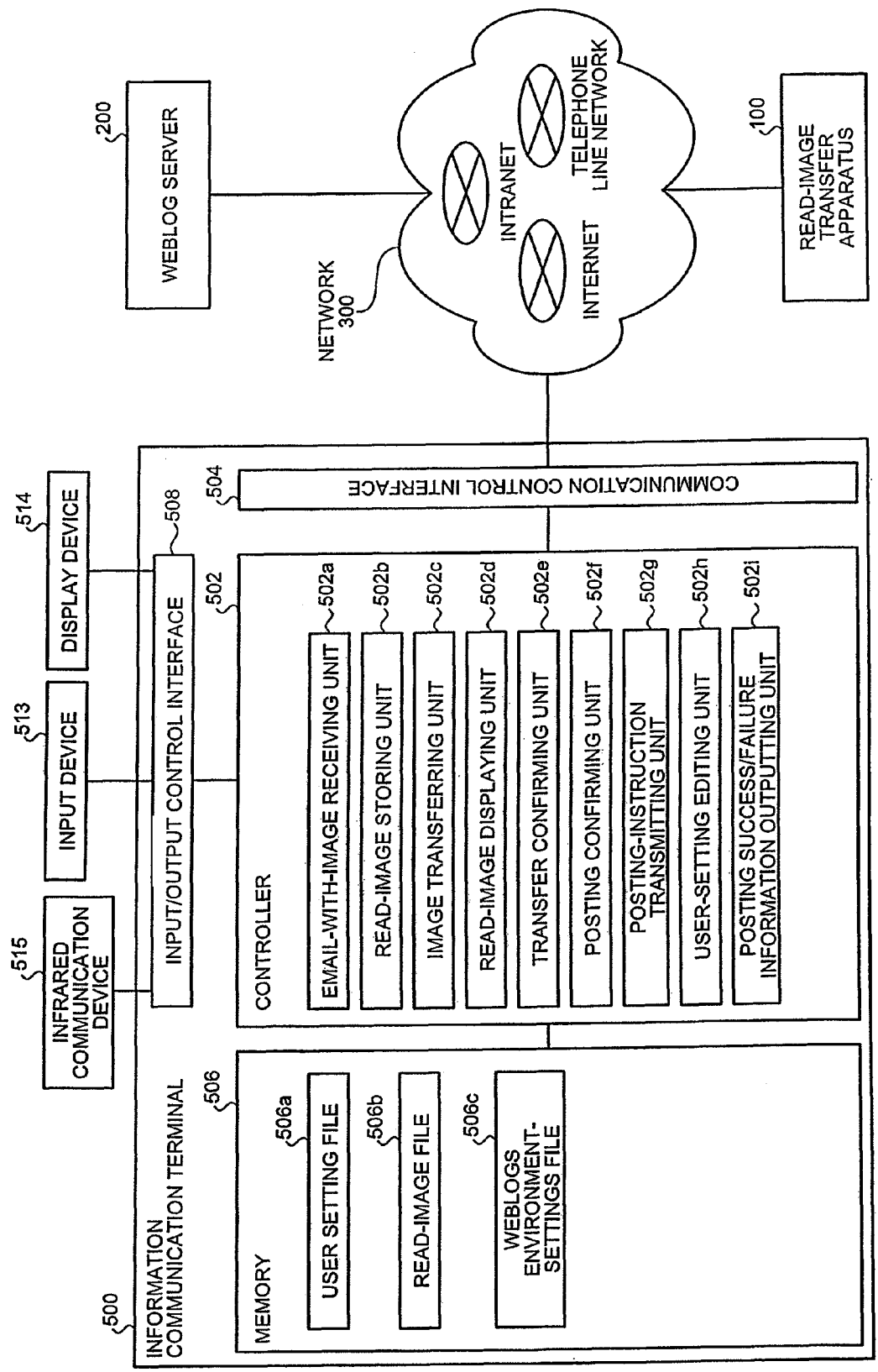
FIG. 3 is a block diagram of one example of an information communication terminal in the read-image transfer system.

As shown in FIG. 2, the information communication terminal 500 is connected to the network 300, and has an email transmission/reception function, and the like. The hardware of the information communication terminal 500 may be configured with an information processor such as a commercially available work station and personal computer, and with its peripherals, and may also be configured with, for example, a mobile phone terminal set, personal digital assistants (PDA), a personal handyphone system (PHS), a pager, and a notebook-size personal computer. The configuration of the information communication terminal 500 is explained in detail below with reference to FIG. 3. FIG. 3 is a block diagram of one example of the information communication terminal 500 in the read-image transfer system.

In FIG. 3, the information communication terminal 500 includes a controller 502 such as CPU that integrally controls the whole of the information communication terminal 500, a communication control interface 504 connected to a communication device (not shown) such as a router, an input/output control interface 508 connected to an input device 513, a display device 514, and to the infrared communication device 515, and a memory 506 that stores therein various types of databases and tables. These components are communicably connected to each other via an arbitrary communication path. Furthermore, the information communication terminal 500 is communicably connected to the network 300 via a wireless communication line of, for example, the communication device such as a router.

The various types of databases and the tables (a user setting file 506*a* to a weblogs environment-settings file 506*c*) stored in the memory 506 are storage units such as a fixed disk drive. The storage units store therein various programs, tables, files, databases, and Web pages respectively used for processes.

Of the components in the memory 506, the user setting file 506*a* is user-setting-information storage means that stores therein user setting information including the destination address information (for example, a destination URL, an end point, an email address) for the weblog server 200, the transfer protocol for the weblog server 200, user ID information for causing the weblog server 200 to identify the user, and the like. The user setting information stored in the user setting file 506*a* may include a connection name that defines a file name of user setting information for each weblog based on each user, end point information that defines an end point published on the weblog, proxy information for mediating the connection between the read-image transfer apparatus 100 and the weblog server 200, image posting format information supported by the weblog server 200, and the like. The user ID information may include password information.

The read-image file 506*b* is read-image storage means that stores therein image information attached to the email received by an email-with-image receiving unit 502*a*.

The weblogs environment-settings file 506*c* is weblogs environment-settings storage means that makes a database of the destination address information, the transfer protocols, and the image posting format information, as environment setting information, for each group of the weblog servers 200. For example, the weblogs environment-settings file 506*c* may store therein, as the transfer protocol supported by the weblog server 200, HTTP, SMTP, and XML-RPC in association with each weblog server 200 or each blog type.

As shown in FIG. 3, the communication control interface 504 controls communications between the information communication terminal 500 and the network 300 (or the communication device). In other words, the communication control interface 504 has a function of communicating data with other terminals connected to the network 300.

As shown in FIG. 3, the input/output control interface 508 controls the input device 513, the display device 514, and the infrared communication device 515. Here the display device 514 is, for example, a liquid crystal display. Further, a push button, a touch panel, a microphone, and the like can be used as the input device 513. Here the input/output control interface 508 may control the infrared communication device 515. The input/output control interface 508 may also control the infrared communication device 515 so as to transmit the user ID, the email address information, or the like.

As shown in FIG. 3, the controller 502 includes an internal memory that stores therein control programs for an operating system (OS) and the like, programs for defining various procedures, and required data, and performs information processing by these programs to execute various processes. The controller 502 functionally includes the email-with-image receiving unit 502$a$, a read-image storing unit 502$b$, an image transferring unit 502$c$, a read-image displaying unit 502$d$, a transfer confirming unit 502$e$, a posting confirming unit 502$f$, a posting-instruction transmitting unit 502$g$, a user-setting editing unit 502$h$, and a posting success/failure information outputting unit 502$i$.

Among these units, the email-with-image receiving unit 502$a$ is email-with-image receiving means that controls the communication control interface 504 so as to receive an email with image information from the network 300.

The read-image storing unit 502$b$ is read-image storing means that stores image information attached to the email received by the email-with-image receiving unit 502$a$ in the read-image file 506$b$. Here the read-image storing unit 502$b$ may store therein the received image information by being converted so as to coincide with the image posting format of the weblog server 200, based on the image posting format information stored in the user setting file 506$a$.

The image transferring unit 502$c$ is image transferring means that controls the communication control interface 504 so as to transfer the image information stored in the read-image file 506$b$ to the weblog server 200 based on the user setting information stored in the user setting file 506$a$.

The read-image displaying unit 502$d$ is read-image displaying means that causes the display device 514 to display thereon the image information stored in the read-image file 506$b$.

The transfer confirming unit 502$e$ is transfer confirming means that prompts the user to enter an instruction, through the input device 513, whether the image transferring unit 502$c$ is caused to transfer the displayed image information to the weblog server 200.

The posting confirming unit 502$f$ is posting confirming means that prompts the user to enter an instruction through the input device 513 whether the image information, transferred by the image transferring unit 102$c$, corresponding to the image information displayed by the read-image displaying unit 502$d$ is to be posted on the weblog.

The posting-instruction transmitting unit 502$g$ is posting-instruction transmitting means that transmits the posting instruction information to the weblog server 200 via the network 300, when the instruction to post the image information is entered from the user through control of the posting confirming unit 502$f$. The posting instruction information is used to cause the weblog server 200 to post the corresponding image formation transmitted by the image transferring unit 102$c$ on the weblog. Here "posting instruction information" may be link information of the image information which is transferred to the database from the weblog and stored in the database.

The user-setting editing unit 502$h$ is user-setting editing means that prompts the user to enter information for the weblog server 200 through the input device 513, sets environment setting information corresponding to the weblog server 200 as the user setting information, based on the environment setting information stored in the weblogs environment-settings file 506$c$, and stores the set information in the user setting file 506$a$. Here the user-setting editing unit 502$h$ may prompt the user to select a blog type (type of weblog) through the input device 513, and set a transfer protocol (such as XML-RPC, and SMTP), an image posting format, or the like, that coincides with the blog type.

The posting success/failure information outputting unit 502$i$ is posting success/failure information outputting means that receives the posting success/failure information on whether the image information transferred by the image transferring unit 502$c$ is successfully posted on the weblog, from the weblog server 200, and outputs the received information to the display device 514. Here the posting success/failure information outputting unit 502$i$ may receive an email notifying the user of the posting success/failure information from the read-image transfer apparatus 100, and output the received email to the display device 514. A destination to which the posting success/failure information outputting unit 502$i$ outputs the information may be not only the display device 514 but also other output devices such as a speaker, a printer, and an external storage device.

One example of the process in the read-image transfer apparatus 100 according to the embodiment configured in the above manner is explained in detail below with reference to FIGS. 2 to 12.

Figure 4:
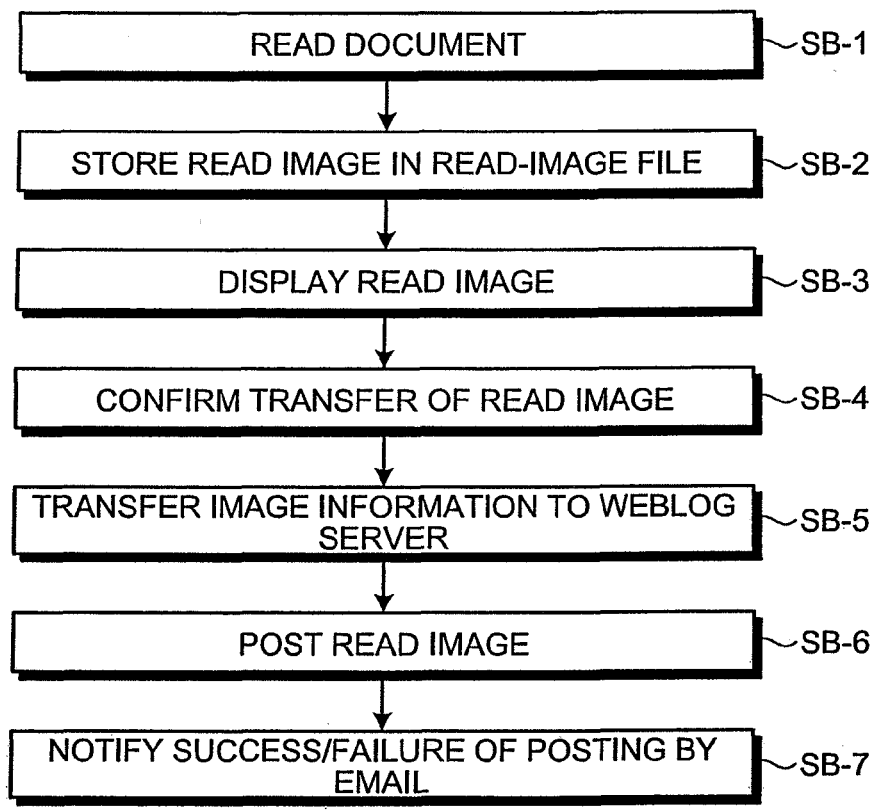
FIG. 4 is a flowchart of one example of a read-image transfer process of a read-image transfer apparatus according to a present embodiment.

At first, the details of a read-image transfer process are explained below with reference to FIGS. 4 to 8. FIG. 4 is a flowchart of one example of the read-image transfer process of the read-image transfer apparatus 100 according to the present embodiment. FIGS. 5 to 8 are schematics of one examples of a process screen, a confirmation screen, a character recognition screen, and a weblog screen, respectively, displayed in the read-image transfer process.

First, the image reading unit 102$a$ controls the input/output control interface 108 so as to read the image information from a document via the image reader 112 (step SB-1). Here the image reading unit 102$a$ may cause the image reader 112 with the radio communication unit to read at least one of the destination address information, the transfer protocol, and the user ID information from the memory transmission unit provided on the document medium (such as the sheet and the carrier sheet).

Next, the read-image storing unit 102$b$ stores the read image information in the read-image file 106$b$ (step SB-2). Here the read-image storing unit 102$b$ may store the read image information in the read-image file 106$b$ by being converted so as to coincide with the image posting format of the weblog server 200 based on the image posting format information stored in the user setting file 106$a$. Here the process screen of the read-image transfer process of FIG. 5 contains a File Save Complete page display screen MA-1, a Pause button MA-2, and a settings display screen MA-3.

Figure 5:
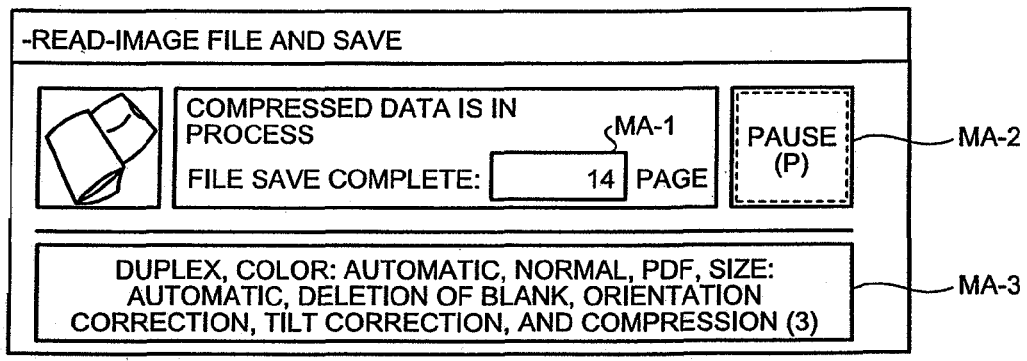
FIG. 5 is a schematic of one example of a process screen of the read-image transfer process.

As shown in FIG. 5, the File Save Complete page display screen MA-1 shows a document page number of the image information currently stored in the read-image file 106$b$ through the process of the read-image storing unit 102$b$. Here the read-image storing unit 102$b$ may prompt the user to press the Pause button MA-2 so as to stop storage of the image information. As shown in the settings display screen MA-3 of FIG. 5, the read-image transfer apparatus 100 may store therein the image information subjected to such set processes as a duplex/single mode, a color/monochrome mode, a format (e.g., JPEG, GIF, and PNG), automatic determination of size, deletion of blank, orientation correction, tilt correction, and compression, based on the user setting information or the like stored in the user setting file 106$a$, through the process of the image reading unit 102$a$ or of the read-image storing unit 102$b$.

Figure 6:
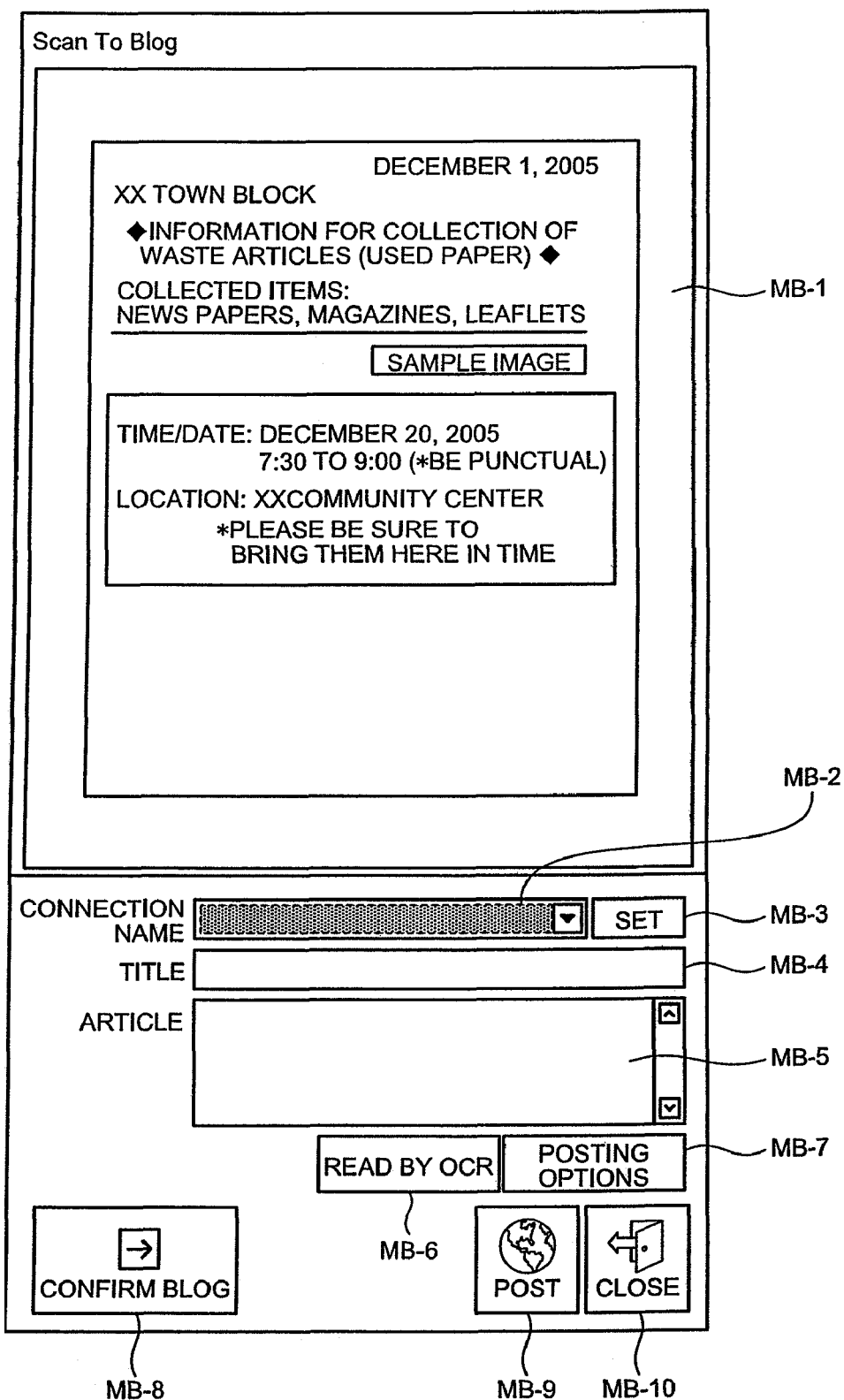
FIG. 6 is a schematic of one example of a confirmation screen of the read-image transfer process.

As shown in FIG. 6, the read-image displaying unit 102$d$ causes the display device 114 to display thereon the image information read by the image reading unit 102$a$ via the input/output control interface 108 (step SB-3). The confirmation screen of FIG. 6 contains a read-image display screen MB-1, a Connection name display screen MB-2, a Set button MB-3, a Title display screen MB-4, an Article display screen MB-5, an OCR Read button MB-6, a Posting Options button MB-7, a Confirm Blog button MB-8, a Post button MB-9, and a Close button MB-10. For example, as shown in FIG. 6, at step SB-3, the read-image displaying unit 102*d* controls so as to display the image information on the read-image display screen MB-1.

Figure 7:
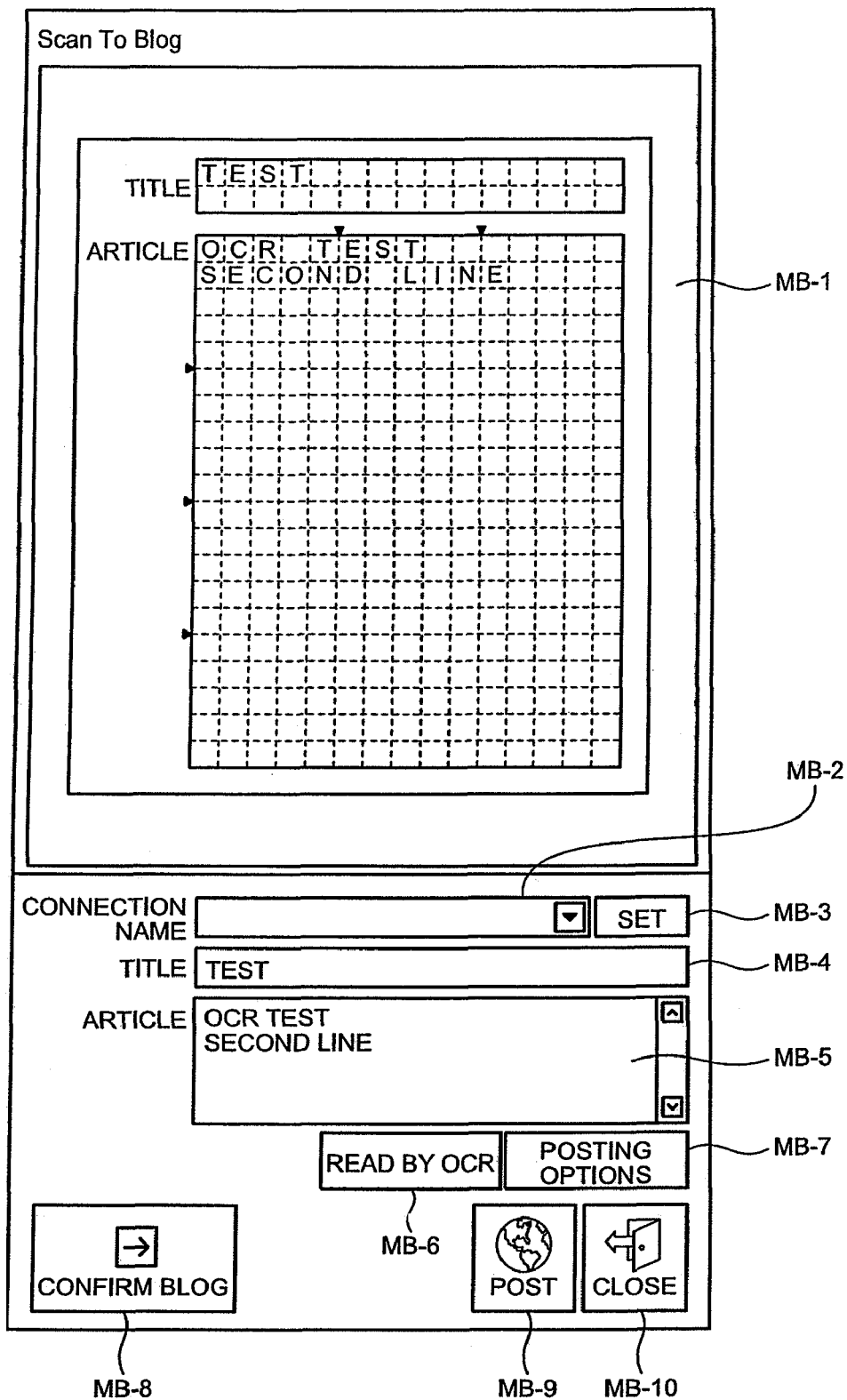
FIG. 7 is a schematic of one example of a character recognition screen of the read-image transfer process.

As shown in FIG. 7, the character recognizing unit 102*g* may acquire information such as character through recognition of characters, symbols, or graphics from the image information stored in the read-image file 106*b*. More specifically, the character recognizing unit 102*g* prompts the user to click on the OCR Read button MB-6 of FIG. 6 through the input device 113, to acquire the information such as character from the image information (FIG. 7). As shown in FIG. 7, the character recognizing unit 102*g* sets the head portion of a character string recognized by the OCR as a title (Title display screen MB-4), and sets the portion after the head portion as an article (Article display screen MB-5). The user can correct the automatically entered title and the article as necessary. Here the user-setting editing unit 102*h* may edit the user setting information so as to set a destination address or the like, based on information such as a URL, a QR code, a bar code, and a seal, of the read information such as character.

The transfer confirming unit 102*e* controls the input/output control interface 108 so that the user enters an instruction, through the input device 113, whether the image information displayed by the read-image displaying unit 102*d* is to be transferred to the weblog server 200 (step SB-4). More specifically, as shown in FIG. 6, the transfer confirming unit 102*e* prompts the user to click on the Post button MB-9 through the input device 113. Before causing the user to click on the Post button MB-9, the transfer confirming unit 102*e* may prompt the user to select the connection name already registered in the Connection name display screen MB-2, or may prompt the user to set the user information using the Set button MB-3. Furthermore, as shown in FIG. 6, the transfer confirming unit 102*e* may prompt the user to click on the Close button MB-10 through the input device 113 so that the image information is not to be transferred to the weblog server 200 by the image transferring unit 102*c*.

When the instruction to transfer the image information is entered from the user through the process of the read-image displaying unit 102*d*, the image transferring unit 102*c* connects itself to the weblog server 200 through the communication control interface 104 via the network 300 based on the user setting information stored in the user setting file 106*a*, and transfers the image information stored in the read-image file 106*b* to the weblog server 200 (step SB-5).

Figure 8:
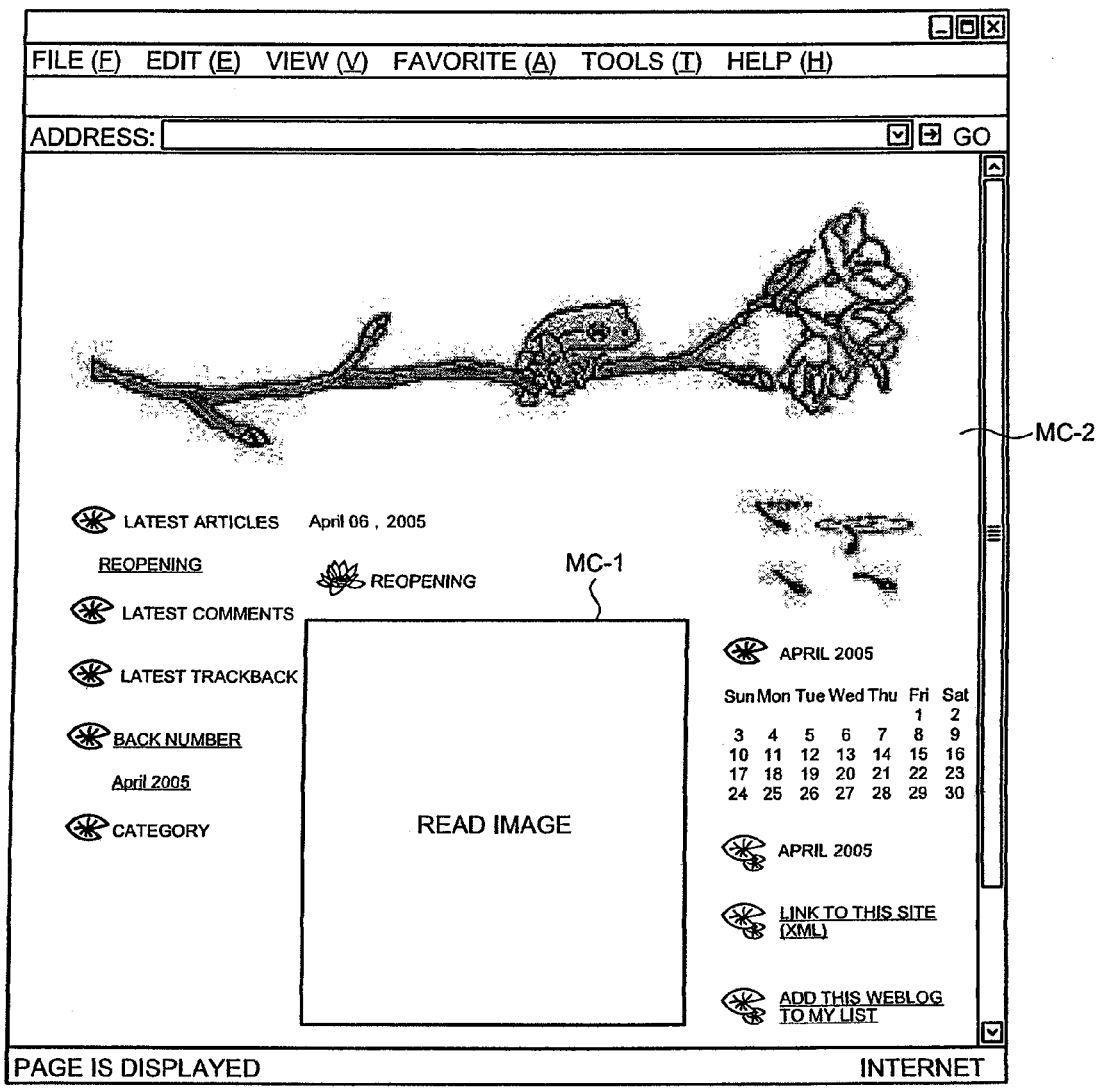
FIG. 8 is a schematic of one example of a weblog screen obtained through the read-image transfer process.

As shown in FIG. 8, the weblog server 200 provides a weblog site MC-2 on which the read image (read-image display screen MC-1) is posted, to the terminal connected to the weblog server 200 via the network 300 (step SB-6). Here the read-image transfer apparatus 100 may prompt the user to click on the Confirm Blog button MB-8 of FIG. 6 through the input device 113 and cause the display device 114 to display the weblog site so that the weblog site can be confirmed via the browser as shown in FIG. 8.

The email notifying unit 102*m* receives posting success/failure information on whether the image information transferred by the image transferring unit 102*c* is successfully posted on the weblog, from the weblog server 200 through the communication control interface 104, and sends an email notifying the user of the posting success/failure information to the email address, as a destination, corresponding to the user ID information stored in the email-notification-list file 106*e* (step SB-7). Here the email notifying unit 102*m* may receive the user ID information, the posting success information, an error code, and the like as posting success/failure information, and send the posting success/failure information by email. This is the end of the read-image transfer process.

Figure 9:
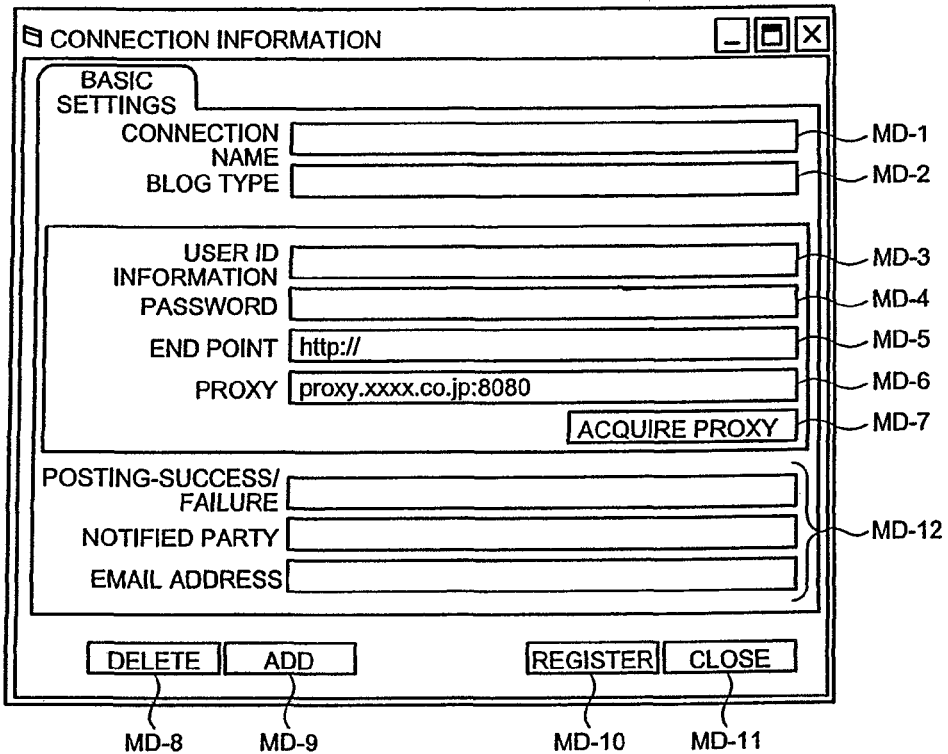
FIG. 9 is a schematic of one example of an operation screen displayed through the process in a user-setting editing unit according to the present embodiment.
Figure 10:
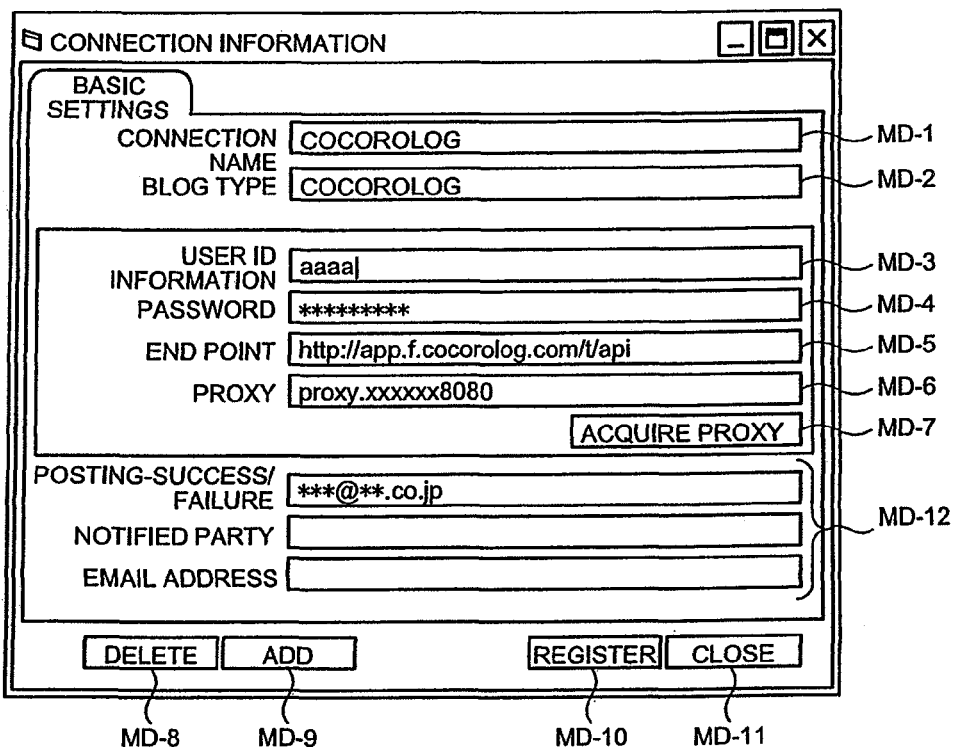
FIG. 10 is a schematic of one example of the operation screen displayed through the process in the user-setting editing unit.

The details of a user-setting editing process performed by the user-setting editing unit 102*h* are explained below with reference to FIGS. 9 to 12. FIGS. 9 and 10 are schematics of one example of an operation screen displayed through the process of the user-setting editing unit 102*h* according to the present embodiment. The process of the user-setting editing unit 502*h* is the same as below and explanation is therefore omitted. The operation screen of FIGS. 9 and 10 contains a Connection name setting screen MD-1, a Blog type setting screen MD-2, a User ID information setting screen MD-3, a Password setting screen MD-4, an End point setting screen MD-5, a Proxy setting screen MD-6, an Acquire Proxy button MD-7, a Delete button MD-8, an Add button MD-9, a Register button MD-10, a Close button MD-11, and a Posting-success/failure notification email address setting screen MD-12.

The user sets the destination or the like and enters the user setting information, especially when the user initially uses the read-image transfer apparatus 100 right after installation of the program thereinto. More specifically, the user-setting editing unit 102*h* prompts the user to click on the Set button MB-3 in the confirmation screen of FIG. 6 through the input device 113 so as to display the setting screen as shown in FIG. 9.

The user-setting editing unit 102*h* prompts the user to enter the connection name in the Connection-name setting screen MD-1 and a blog type (type of weblog) in the Blog type setting screen MD-2 through the input device 113.

The user-setting editing unit 102*h* sets environment setting information corresponding to the entered blog type as the user setting information based on the environment setting information stored in the weblogs environment-settings file 106*d*, and stores the set information in the user setting file 106*a*. Here the user-setting editing unit 102*h* may prompt the user to select the weblog server 200 from the list through the input device 113.

The blog type is roughly classified into two types in the present embodiment. In a MovableType weblog as one of the types, the image transferring unit 102*c* transfers image information using XML-RPC as the transfer protocol, while in a weblog as the other type which allows posting of image information by email, the image transferring unit 102*c* transfers image information using SMTP as the transfer protocol.

When the MovableType of blog type is entered as the user setting information, as shown in FIG. 10, the user-setting editing unit 102*h* prompts the user to set the user ID information in the User ID information setting screen MD-3, the password in the Password setting screen MD-4, the end point as the destination address in the End point setting screen MD-5, and the proxy in the Proxy setting screen MD-6 through the input device 113. The user-setting editing unit 102*h* may prompt the user to click on the Acquire Proxy button MD-7 so as to automatically set the proxy.

On the other hand, when the blog type which allows posting of image information by email is set, the user-setting editing unit 102*h* prompts the user to enter an email address (destination) to which the user sends an email, an email address (source) from which the user sends an email, an email server (SMTP), and a top page URL, through the input device 113.

The user-setting editing unit 102*h* prompts the user to click on the Register button MD-10 through the input device 113, and stores various types of setting information entered by the user, as the user setting information, in the user setting file 106*a*.

With these steps, the setting process is completed. Because the user setting information is stored in the user setting file 106a, there is no need to set these pieces of information again upon usage of the information at a second time and thereafter. Moreover, each entry may be configured to be automatically entered. For example, the user-setting editing unit 102h may be configured to automatically recognize each protocol.

The user-setting editing unit 102h may prompt the user to click on the Add button MD-9 through the input device 113 so as to add setting information to the user setting information. The user-setting editing unit 102h may prompt the user to click on the Delete button MD-8 through the input device 113 so as to delete the user information.

The email notifying unit 102m may prompt the user to enter an email address as a destination of the posting success/failure information in the Posting-success/failure notification email address setting screen MD-12 through the input device 113, to store the entered email address in association with the user ID information in the email-notification-list file 106e.

The user-setting editing unit 102h may prompt the user to enter posting options. FIG. 11 is a schematic of one example of an entry screen of posting options. The entry screen of FIG. 11 contains a Category select screen ME-1, an Article status select screen ME-2, a Publish time setting screen ME-3, a Comment acceptance select screen ME-4, a Trackback acceptance select screen ME-5, a Trackback target setting screen ME-6, and an OK button ME-7.

As shown in FIG. 11, the user-setting editing unit 102h prompts the user to select a category of a weblog article in the Category select screen ME-1 through the input device 113. Here the read-image transfer apparatus 100 may be configured to automatically acquire the category or the like from the weblog server 200. The user-setting editing unit 102h prompts the user to select a status of an article: "Publish right now" or "Publish later" in the Article status select screen ME-2, through the input device 113. When the "Publish later" is selected in the Article status select screen ME-2, the user-setting editing unit 102h may prompt the user to enter a time to be published in the Publish time setting screen ME-3 through the input device 113.

The user-setting editing unit 102h also prompts the user to select whether a comment is accepted in the Comment acceptance select screen ME-4 through the input device 113. Furthermore, the user-setting editing unit 102h prompts the user to select whether a trackback is accepted in the Trackback acceptance select screen ME-5 through the input device 113. When the acceptance of the trackback is selected in the Trackback acceptance select screen ME-5, the user-setting editing unit 102h prompts the user to enter a trackback target URL in the Trackback target setting screen ME-6 through the input device 113. Then, the user-setting editing unit 102h prompts the user to click on the OK button ME-7 through the input device 113 so that the posting options are stored in the memory 106 (e.g., the user setting file 106a).

The user-setting editing unit 102h may also prompt the user to enter an operating environment setting. FIG. 12 is a schematic of one example of an Operating environment settings entry screen. The Operating environment settings entry screen of FIG. 12 contains a Destination address entry screen MF-1, a User ID information entry screen MF-2, a Password entry screen MF-3, a Blog type select screen MF-4, a Self-Diagnosis button MF-5, a Title entry screen MF-6, a Category entry screen MF-7, an Add and Delete button MF-8, a Publish/Not Publish radio button MF-9, a Comment Accept radio button MF-10, a Trackback Accept radio button MF-11, an Expiration date entry screen MF-12, an OK button MF-13, and a Cancel button MF-14.

As shown in FIG. 12, the user-setting editing unit 102h prompts the user to enter a destination address in the Destination address entry screen MF-1, user ID information in the User ID information entry screen MF-2, a password in the Password entry screen MF-3, and a blog type in the Blog type select screen MF-4. As shown in FIG. 12, the user-setting editing unit 102h may prompt the user to click on the Self-Diagnosis button MF-5 through the input device 113 so as to finely adjust HTTP parameters by test-posting as a Self-Diagnosis process.

Furthermore, as shown in FIG. 12, the user-setting editing unit 102h prompts the user to enter, through the input device 113, a title in the Title entry screen MF-6, a category of a weblog article in the Category entry screen MF-7, and an instruction whether the setting information is to be added or deleted in the Add and Delete button MF-8. The user-setting editing unit 102h also prompts the user to enter, through the input device 113, an instruction whether the article is published on the weblog in the Publish/Not Publish radio button MF-9, an instruction whether a comment is accepted in Comment Accept radio button MF-10, an instruction whether a trackback is accepted in the Trackback Accept radio button MF-11, and an expiration date of the post on the weblog in the Expiration date entry screen MF-12.

The user-setting editing unit 102h prompts the user to click the OK button MF-13 through the input device 113, and stores the various settings in the user setting file 106a when the OK button MF-13 is clicked. On the other hand, when the Cancel button MF-14 is clicked, the user-setting editing unit 102h ends the setting process without updating the user settings. This is the end of explanation of the setting process.

That is all the explanation provided for the processes in the read-image transfer apparatus according to the present embodiment. With the configuration as mentioned above, the explanation of the processes in the read-image transfer system according to the present embodiment is ended. According to the embodiment, the troublesome operation procedure can be omitted and even the users who are unfamiliar with operating the computer can thereby easily post on a weblog. Moreover, the user can register a document freely created by the user on an arbitrary weblog.

In addition, troublesome keyboard entry is not needed any more. Particularly, it is possible to omit the complicated operation procedure upon usage of the information particularly at the second time and thereafter. That is, the user can post an article on a weblog with only a few operations (for example, start of reading and confirmation of post). Moreover, the weblogs environment settings file is provided to store therein the environment setting information used to be connected to a weblog, to transfer an article, or to post an article on the weblog for each weblog server group. Thus, the number of items in the environment setting information essentially set by the user can be reduced, and the time and the procedure required for the start of the usage can also be reduced. The difference in methods of posting on blogs (such as transfer protocol) can also be accommodated.

That is all the explanation provided for the processes in the read-image transfer apparatus 100.

One example of the processes in the read-image transfer system according to the present embodiment configured with the information communication terminal is explained in detail below with reference to FIGS. 13 and 14.

Figure 13:
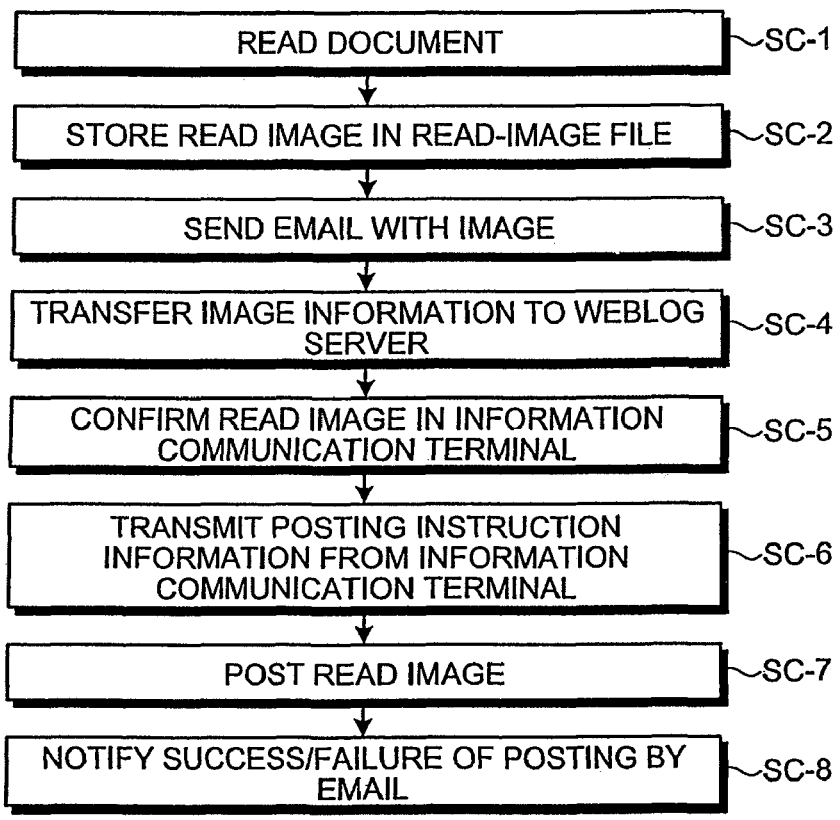
FIG. 13 is a flowchart of one example of a read-image transfer process (instruction to post) in the read-image transfer system according to the present embodiment.

FIG. 13 is a flowchart of one example of the read-image transfer process (instruction to post) in the read-image transfer system according to the present embodiment.

As shown in FIG. 13, at first, in the read-image transfer apparatus 100, the image reading unit 102a controls the image reader 112 so as to read image information from a document (step SC-1).

Next, in the read-image transfer apparatus 100, the read-image storing unit 102b stores the read image information in the read-image file 106b (step SC-2).

In the read-image transfer apparatus 100, the email-with-image sending unit 102f sends an email with the image information stored in the read-image file 106b to the information communication terminal 500 (step SC-3). Here the email-with-image sending unit 102f may send an email with image information of which image size is reduced (for example, thumbnail images). The email-with-image sending unit 102f may also be configured to send an email with the image information stored in the read-image file 106b to the information communication terminal 500 when payment is made by the IC card through the IC-card payment controlling unit 102j.

The infrared communicating unit 102i may control the infrared communication device 115 so as to perform infrared communication, to acquire user ID information and/or email address information, then the email-with-image sending unit 102f may also send an email to the information communication terminal 500 using the email address, as a destination, acquired through the process of the infrared communicating unit 102i or using the email address stored in the user information file 106c corresponding to the user ID information acquired through the process of the infrared communicating unit 102i. Here, when the user ID and/or the email address are acquired through the process of the infrared communicating unit 102i, the user-information storing unit 102k may store the acquired information in the user information file 106c.

In the read-image transfer apparatus 100, the image transferring unit 102c connects itself to the weblog server 200 through the communication control interface 104 via the network 300 based on the user setting information stored in the user setting file 106a, and transfers the image information stored in the read-image file 106b to the weblog server 200 (step SC-4). Here the image transferring unit 102c may also be configured to transfer the stored image information to the weblog server 200 when payment is made by the IC card through the control of the IC-card payment controlling unit 102j. In this case, it does not matter at which of the step SC-3 and the step SC-4 the process is preferentially performed. Furthermore, in the read-image transfer system, the weblog server 200 stores the image information transferred from the read-image transfer apparatus 100 in the database, and does not post the read image on the weblog before the posting instruction information is received.

Subsequently, in the information communication terminal 500, the read-image storing unit 502b stores the image information attached to the email sent from the read-image transfer apparatus 100 and received by the email-with-image receiving unit 502a, in the read-image file 506b, and the read-image displaying unit 502d causes the display device 514 to display thereon the image information stored in the read-image file 506b.

In the information communication terminal 500, the posting confirming unit 502f prompts the user to enter an instruction whether the image information, transferred by the image transferring unit 102c to the weblog server 200, corresponding to the image information displayed by the read-image displaying unit 502d is to be posted on the weblog through the input device 513 (step SC-5).

Further, in the information communication terminal 500, when the posting confirming unit 502f confirms the entry of the instruction that the image information is to be posted, sent from the user, the posting-instruction transmitting unit 502g transmits the posting instruction information to the weblog server 200 so as to cause the weblog server 200 to post the received image information on the weblog (step SC-6).

The weblog server 200 having received the posting instruction information provides the weblog site on which the read image is posted, to the terminal connected to the weblog server 200 via the network 300 (step SC-7). More specifically, the weblog server 200 having received the posting instruction information may form a link from the website to the image information stored in the database.

The weblog server 200 transmits the posting success/failure information on whether the image information transferred by the image transferring unit 102c is successfully posted on the weblog, to the read-image transfer apparatus 100. In the read-image transfer apparatus 100 having received the posting success/failure information, the email notifying unit 102m sends an email notifying the user of the posting success/failure information to the email address, as a destination, corresponding to the user ID information stored in the email-notification-list file 106e (step SC-8). With these steps, in the information communication terminal 500 of the user, the posting success/failure information outputting unit 502i controls the communication control interface 504 so as to receive the email, and causes the display device 514 to provide the posting success/failure information to the user. Here in the information communication terminal 500, the posting success/failure information outputting unit 502i may directly receive the posting success/failure information from the weblog server 200.

The details of the read-image transfer process (direct posting from a mobile telephone) in the read-image transfer system are explained below with reference to FIG. 14. FIG. 14 is a flowchart of one example of the read-image transfer process (direct posting from a mobile phone) in the read-image transfer system according to the present embodiment.

Figure 14:
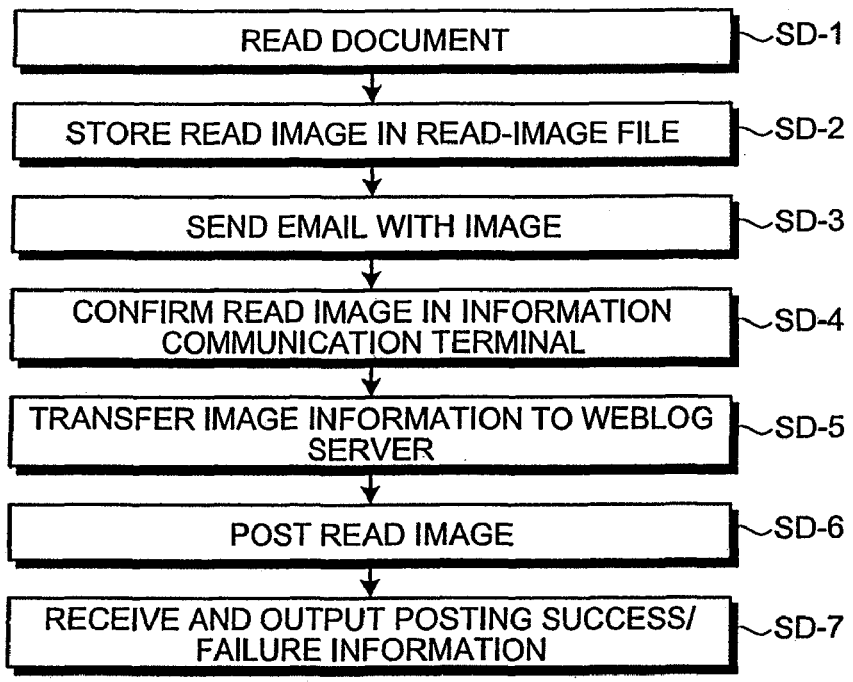
FIG. 14 is a flowchart of one example of a read-image transfer process (direct posting from a mobile phone) in the read-image transfer system according to the present embodiment.

As shown in FIG. 14, at first, in the read-image transfer apparatus 100, the image reading unit 102a controls the image reader 112 so as to read image information from a document (step SD-1).

Next, in the read-image transfer apparatus 100, the read-image storing unit 102b stores the read image information in the read-image file 106b (step SD-2).

In the read-image transfer apparatus 100, the email-with-image sending unit 102f sends an email with the image information stored in the read-image file 106b to the information communication terminal 500 (step SD-3). Here the email-with-image sending unit 102f may send an email with image information of which image size is reduced (for example, thumbnail images). The email-with-image sending unit 102f may also be configured to send an email with the image information stored in the read-image file 106b to the information communication terminal 500 when payment is made by the IC card through the IC-card payment controlling unit 102j.

The infrared communicating unit 102i may control the infrared communication device 115 so as to perform infrared communication, to acquire user ID information and/or email address information, then the email-with-image sending unit 102f may also send an email to the information communication terminal 500 using the email address, as a destination, acquired through the process of the infrared communicating unit 102i or using the email address stored in the user information file 106c corresponding to the user ID information acquired through the process of the infrared communicating unit 102i. Here, when the user ID and/or the email address are acquired through the process of the infrared communicating unit 102*i*, the user-information storing unit 102*k* may store the acquired information in the user information file 106*c*.

Subsequently, in the information communication terminal 500, the read-image storing unit 502*b* stores the image information attached to the email sent from the read-image transfer apparatus 100 and received by the email-with-image receiving unit 502*a*, in the read-image file 506*b*, and the read-image displaying unit 502*d* causes the display device 514 to display thereon the image information stored in the read-image file 506*b*.

In the information communication terminal 500, the transfer confirming unit 502*e* prompts the user to enter an instruction whether the image information displayed by the read-image displaying unit 502*d* is to be transferred to the weblog server 200, through the input device 513 (step SD-4).

In the information communication terminal 500, when the transfer confirming unit 502*e* confirms the entry of the instruction to transfer the image information from the user, the image transferring unit 502*c* connects itself to the weblog server 200 based on the user setting information stored in the user setting file 506*a*, and transfers the image information stored in the read-image file 506*b* to the weblog server 200 (step SD-5).

With these steps, the weblog server 200 provides the weblog site on which the read image is posted, to the terminal connected to the weblog server 200 via the network 300 (step SD-6). Here the weblog server 200 transmits the posting success/failure information on whether the image information transferred by the image transferring unit 502*c* is successfully posted on the weblog, to the information communication terminal 500.

Further, in the information communication terminal 500, the posting success/failure information outputting unit 502*i* controls the communication control interface 504 so as to receive the posting success/failure information and notifies the user of the posting success/failure information by using the display device 514 through the input/output control interface 508 (step SD-7). Here the posting success/failure information outputting unit 502*i* may receive the posting success/failure information via the read-image transfer apparatus 100 by the email notifying unit 102*m*. In the information communication terminal 500, the posting success/failure information outputting unit 502*i* may receive the user ID information, the posting success information, and the error code as the posting success/failure information, and output the posting success/failure information to the display device 514.

That is all the explanation provided for the processes in the read-image transfer system according to the present embodiment. According to the present embodiment, the troublesome operation procedure can be omitted and even the users who are unfamiliar with operating the computer can thereby easily post on a weblog. Moreover, the user can register a document freely created by the user on an arbitrary weblog.

In addition, troublesome keyboard entry is not needed any more. It is therefore possible to omit the complicated operation procedure upon usage of the information particularly at the second time and thereafter. Namely, the user can post an article on a weblog with only a few operations (for example, start of reading and confirmation of post). Moreover, the weblogs environment settings file is provided so as to store therein the destination address information or the transfer protocol as the environment setting information for each group of the weblog servers 200. Thus, the difference in methods of posting on blogs (such as transfer protocol) can also be accommodated.

Figure 15:
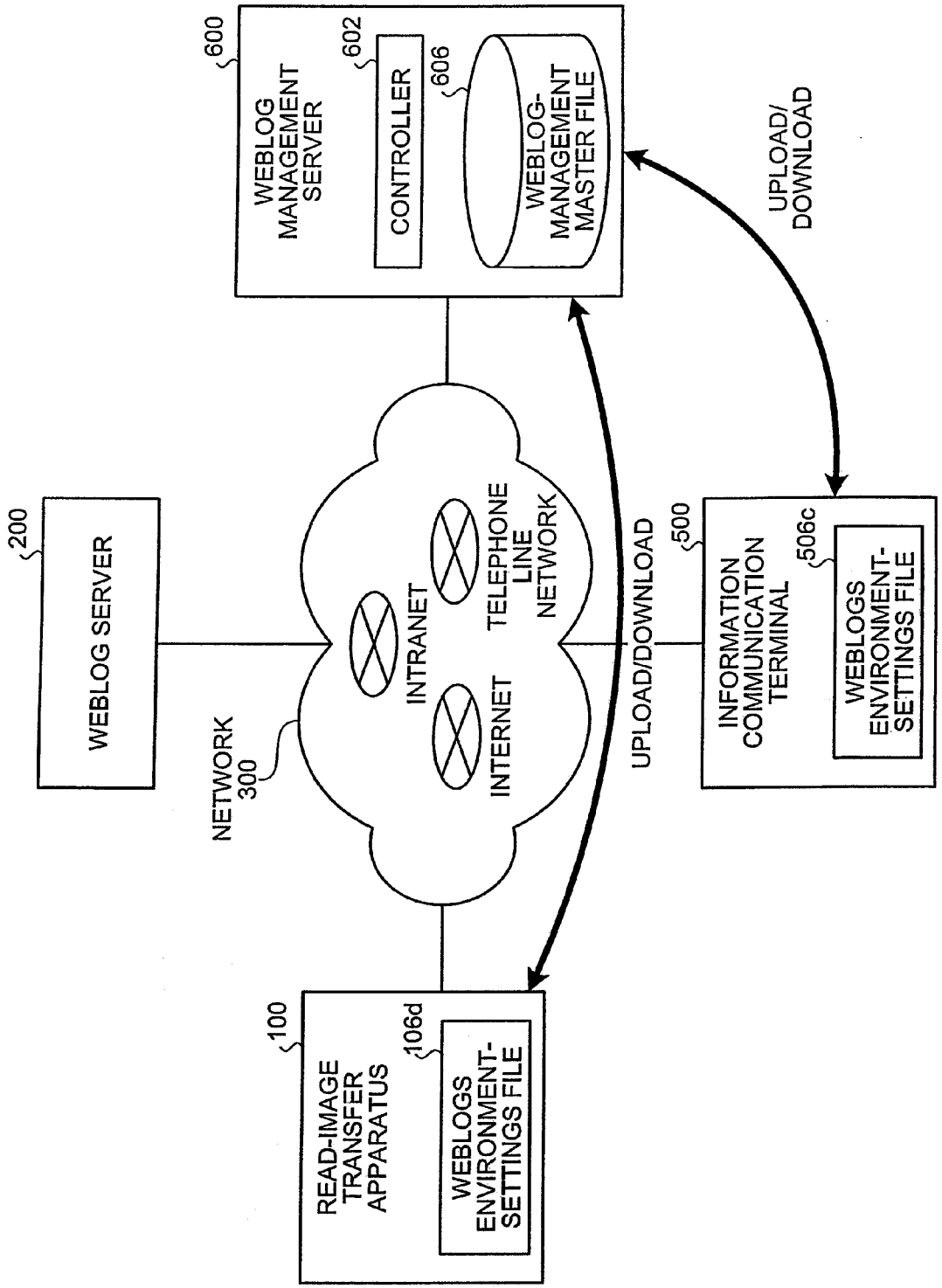
FIG. 15 is a conceptual diagram of one example of the system further including a weblog management server and its processes.

Although the embodiment of the present invention is explained so far, the present invention may be implemented in different embodiments without departing from scope of the technological ideas described in claims of the present invention. FIG. 15 is a conceptual diagram of one example of the system further including a weblog management server 600.

As shown in FIG. 15, the system according to another embodiment includes the read-image transfer apparatus 100, the weblog server 200, the information communication terminal 500, and the weblog management server 600, all of which is communicably connected to each other via the network 300. A memory of the weblog management server 600 includes a weblog-management master file 606 that stores therein the destination address information, the transfer protocol, or the image posting format information as basic environment setting information for each group of the weblog servers 200.

In the system, as shown in FIG. 15, the user-setting editing unit 102*h* references the basic environment setting information stored in the weblog-management master file 606 to update the environment setting information stored in the weblogs environment-settings file 106*d*. More specifically, in the read-image transfer apparatus 100, the user-setting editing unit 102*h* controls the communication control interface 104 so as to be connected to the weblog management server 600, and downloads the basic environment setting information stored in the weblog-management master file 606, to update the environment setting information stored in the weblogs environment-settings file 106*d*.

As shown in FIG. 15, the user-setting editing unit 102*h* may be configured to upload the environment setting file stored in the weblogs environment-settings file 106*d* to the weblog management server 600. More specifically, by uploading the environment setting file, the user-setting editing unit 102*h* causes the weblog management server 600 to collect environment setting files such as destination addresses of weblog servers 200, transfer protocols, and image posting format information from a plurality of read-image transfer apparatuses 100 or a plurality of information communication terminals 500.

For example, a controller 602 of the weblog management server 600 causes the read-image transfer apparatuses 100 or the information communication terminals 500 to upload the environment setting information stored in the weblogs environment-settings file (106*d* or 506*c*), in order to collect the uploaded environment setting information, and store the collected information as the basic environment setting information in the weblog-management master file 606. The controller 602 also causes the read-image transfer apparatuses 100 or the information communication terminals 500 to download the basic environment setting information stored in the weblog-management master file 606. In the system according to the another embodiment, the user-setting editing unit 502*h* in the controller 502 of the information communication terminal 500 has also the same function as that of the user-setting editing unit 102*h*, and thus explanation thereof is omitted.

Figure 16:
FIG. 16 is a schematic of one example of a sheet, as a document medium, provided thereon with a bar code.
Figure 17:
FIG. 17 is a schematic of one example of a sheet, as a document medium, provided thereon with a QR code.

The document medium used when the read-image transfer apparatus 100 is caused to read the image information via the image reader 112 is explained below with reference to FIGS. 16 to 18. FIG. 16 is a schematic of one example of a sheet, as the document medium, provided thereon with a bar code. FIG. 17 is a schematic of one example of a sheet, as the document medium, provided thereon with a QR code. FIGS. 18A to 18C are schematics of one example of how to use a carrier sheet, as the document medium, provided thereon with a RFID chip.

As shown in FIG. 16, the sheet with the bar code thereon may be used as the document medium causing the read-image transfer apparatus 100 to read the document medium via the image reader 112. As shown in FIG. 17, the sheet with the QR code thereon may be used as the document medium. The bar code or the QR code is provided so as to cause the read-image transfer apparatus 100 to read at least one of the destination addresses information, the transfer protocol, and the user ID information. With this feature, the character recognizing unit 102g acquires information for the destination addresses information, the transfer protocol, or the user ID information from the image information read by the image reading unit 102a. The user-setting editing unit 102h thereby updates the user setting information stored in the user setting file 106a based on the acquired destination address information or the like. Thus, the user can post the read image on the weblog without setting the destination and the like.

Figure 18A:
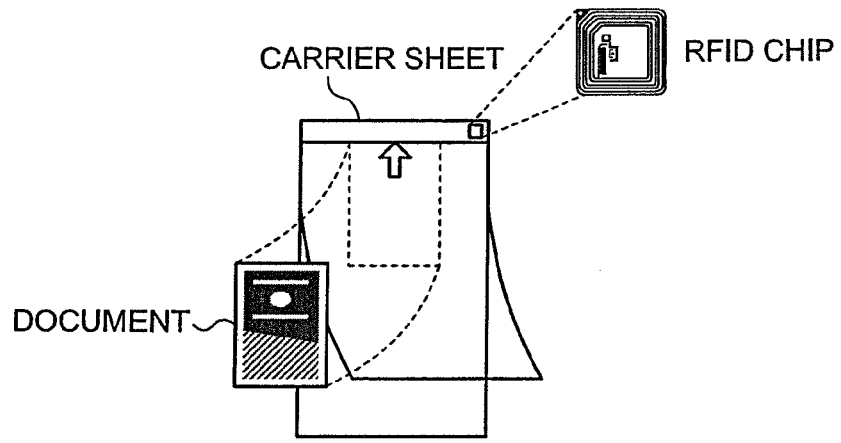
FIGS. 18A to 18C are schematics of one example of how to use a carrier sheet, as a document medium, provided thereon with a RFID chip.
Figure 18B:
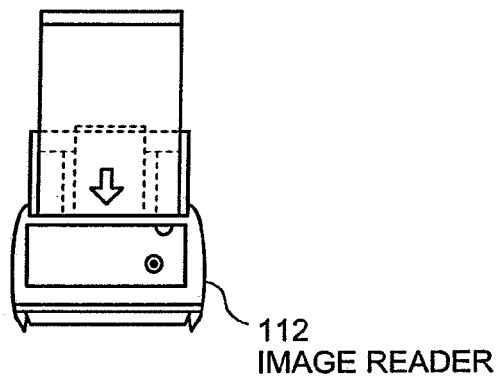
Figure 18C:

As shown in FIGS. 18A to 18C, the carrier sheet may also be used as a medium to carry a document to the image reader 112 so that the image information is read via the image reader 112 provided with the radio communication unit. More specifically, as shown in FIG. 18A, the carrier sheet is formed with a transparent sheet and a backing sheet, and at least one side of the carrier sheet is fixed so that a document can be inserted between the transparent sheet and the backing sheet. Further, the carrier sheet is provided thereon with a RFID chip that stores therein at least one of the destination address information, the transfer protocol, and the user ID information, and transmits the stored information to the read-image transfer apparatus 100 via the image reader 112 with the radio communication unit.

As a method of using the carrier sheet, at first, the user inserts the document between the transparent sheet and the backing sheet of the carrier sheet (see FIG. 18A), and sets the carrier sheet in an inserting port of the image reader 112 (see FIG. 18B). Next, in the read-image transfer apparatuses 100, the image reading unit 102a controls the image reader 112 with the radio communication unit so as to read information such as the destination address information or the like stored in the RFID chip (see FIG. 18C). With these steps, the read-image transfer apparatuses 100 causes the user-setting editing unit 102h to update the user setting information stored in the user setting file 106a based on the acquired destination address information or the like. Thus, the user can post the read image on the weblog without setting the destination or the like.

In the embodiments, the case where the read-image transfer apparatus 100 performs the process in the form of stand-alone device is explained as one example. However, the read-image transfer apparatuses 100 may be configured to perform the process according to a request from a client terminal which is provided separately from the read-image transfer apparatuses 100. Especially, when a device including at least an image reading unit and a device including at least a transfer confirming unit are provided separately from each other, the transfer confirming unit of the device may be started in response to an image reading process performed by the device including the image reading unit. With the configuration as above, the operation of the device (e.g., computer) with the transfer confirming unit can be eliminated.

In the embodiments, the explanation is made so that the blog type (type of weblog) seems to be one type for each weblog server 200, however, the weblog server 200 may be provided with a plurality of blog types. In this case, the weblogs environment-settings file 106d and the weblogs environment-settings file 506c respectively store therein the destination addresses information, and the transfer protocol and the like, for each type of the weblog server 200 which is formed with the blog types.

The whole of or part of the processes, of the processes explained in the embodiments, explained as being automatically performed can be manually performed. Alternatively, the whole of or part of the processes explained as being manually performed can be automatically performed using a known method. In addition, the procedures, the control procedures, and the specific names which are shown in the documents and the drawings, the information including registered data and parameters for the processes, the screen examples, and the database configurations can be arbitrarily changed unless otherwise specified.

Further, in the read-image transfer apparatuses 100 and the information communication terminal 500, the components, which are shown in the drawings, are only functionally schematic, and thus the components are not always physically configured as shown in the drawings.

For example, the process functions respectively provided in the units of the read-image transfer apparatuses 100 and the information communication terminal 500, especially all of or arbitrary part of the process functions performed in the controller 102 and the controller 502 can be realized by a central processing unit (CPU) and by the program which is interpreted and executed in the CPU, or can be realized as hardware based on a wired logic. The program is stored in a recording medium explained later, and is mechanically read by the read-image transfer apparatus 100 as required. More specifically, the memory 106 and the memory 506, such as a read only memory (ROM) or a HD, store therein computer programs to give instructions to the CPU as an operating system (OS) and to cause the computer to perform various processes. The computer programs are loaded into the RAM and executed, to form the controller in cooperation with the CPU.

The computer programs may be stored in an application program server connected to the read-image transfer apparatuses 100 or to the information communication terminal 500 via an arbitrary network 300, or all of or part of the computer programs can be downloaded as necessary.

The program according to the present invention can also be stored in a computer-readable recording medium. The "recording medium" includes an arbitrary "portable physical medium" such as a flexible disk, a magneto-optical disc (MO), a read only memory (ROM), an erasable and programmable read-only memory (EPROM), an electrically erasable programmable read-only memory (EEPROM), a compact disk read only memory (CD-ROM), and a digital versatile disk (DVD). Alternatively, the "recording medium" includes a "communication medium" that temporarily carries the program such as a communication line and a carrier wave when the program is transmitted via a network represented by a local area network (LAN), a wide area network (WAN), and the Internet.

The "program" is a data processing method described in an arbitrary language or description method, and does not require any particular form such as a source code and a binary code. The "program" is not necessarily limited to a singly configured one, and thus, the "program" includes a distributed configuration as a plurality of modules and libraries, and a configuration that achieves its function in cooperation with other programs represented by the OS. A known configuration and procedure can be used as a specific configuration and a reading procedure to read a recording medium in the devices shown in the embodiments, or can be used as an installation procedure after the recording medium is read.

The various types of databases stored in the memory 106 and the memory 506, such as the user setting file 106a to the email-notification-list file 106e and the user setting file 506a to the weblogs environment-settings file 506c, are memory devices such as RAM and ROM, fixed disk drives such as a hard disk, or storage units such as a flexible disk and an optical disc. These storage devices store therein various programs, tables, databases, and files for web pages respectively used for processes and used to provide a website.

The read-image transfer apparatus 100 may also be realized by being connected with an information processor such as a known personal computer and work station, and incorporating software (including programs and data) in the information processor to implement the method according to the present invention.

Furthermore, the specific modes of distribution or integration of the devices are not limited by the ones shown in the figures, and thus, the mode can be configured by functionally or physically distributing or integrating all of or part of the devices by arbitrary units according to various additions.

According to the present invention, even the users who are unfamiliar with operating the computer can easily post on a weblog, and the operation procedure which is troublesome even for other users who are familiar with the computer can be omitted. Moreover, the user can register a document freely created by the user on an arbitrary weblog without being conscious of any difference in posting methods and registering methods between weblogs. Furthermore, according to the present invention, a blog can be easily opened.

According to the present invention in particular, when the user wants to post a paper document (e.g., sales promotional advertising, catalog, management message, handwriting memo) on a weblog, there is no need to transfer read image data from the image reader to the information processor such as a personal computer, and the read image can thereby easily be registered on the weblog. Thus, it is advantageous that the image reader and the weblog are used for wider purposes.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A read-image transfer apparatus connected to an image reader and to a weblog server via a network, comprising:
   a memory; and
   a controller, wherein
   the memory includes
      a user-setting-information storage unit that stores therein user setting information including at least destination address information for the weblog server, a transfer protocol for the weblog server, and user identification information for causing the weblog server to identify a user, and
   the controller includes
      an image reading unit that controls the image reader so as to read image information from a document;
      a read-image storing unit that stores the read image information in the memory; and
      an image transferring unit that transfers the image information stored by the read-image storing unit to the weblog server, based on the user setting information stored in the user-setting-information storage unit.

2. The read-image transfer apparatus according to claim 1, wherein the read-image transfer apparatus further comprises:
   a display unit; and
   an input unit, wherein the controller further includes
      a read-image displaying unit that controls the display unit so as to display thereon the image information read by the image reading unit; and
      a transfer confirming unit that prompts the user to enter an instruction whether the displayed image information is to be transferred to the weblog server by the image transferring unit, through the input unit, and
   when the transfer confirming unit confirms that the instruction to transfer the image information is entered by the user, the image transferring unit transmits the image information stored by the read-image storing unit, to the weblog server.

3. The read-image transfer apparatus according to claim 1, wherein the memory further includes
   a weblogs environment-settings storage unit that stores therein the destination address information or the transfer protocol as environment setting information for each weblog server group, and
   the controller further includes
      a user-setting editing unit that prompts the user to enter information for the weblog server through the input unit, sets the environment setting information corresponding to the weblog server as the user setting information based on the environment setting information stored in the weblogs environment-settings storage unit, and stores the set environment setting information in the user-setting-information storage unit.

4. The read-image transfer apparatus according to claim 1, wherein the user setting information further includes
   image posting format information for the weblog server, and
   the read-image storing unit stores the read image information in the memory by being converted so as to coincide with the image posting format of the weblog server based on the image posting format information stored in the user-setting-information storage unit.

5. The read-image transfer apparatus according to claim 1, wherein the controller further includes a character recognizing unit that recognizes a character, a symbol, or a graphic in the image information to acquire information such as character therefrom.

6. The read-image transfer apparatus according to claim 5, wherein the user-setting editing unit edits the user setting information based on the information such as character acquired by the character recognizing unit.

7. The read-image transfer apparatus according to claim 1, further connected to an integrated circuit (IC) card reader, wherein the controller further includes
   an IC-card payment controlling unit that controls IC-card payment through the IC card reader, and
   when payment is made by the IC card through the IC-card payment controlling unit,
   the image transferring unit transmits the image information stored by the read-image storing unit, to the weblog server.

8. The read-image transfer apparatus according to claim 1, wherein the memory further includes
   an email-notification-list storage unit that stores therein email address information for the user in association with the user identification information, and
   the controller further includes
      an email notifying unit that receives posting success/failure information on whether the transferred image information is successfully posted on the weblog, from the weblog server, and sends an email notifying the user of the posting success/failure information to the email address as a destination corresponding to the user identification information.

9. The read-image transfer apparatus according to claim 1, further connected to a weblog management server that includes a memory, via the network, wherein
the memory of the weblog management server includes
a weblog-management basic-information storage unit that stores therein the destination address information, the transfer protocol, or the image posting format information as basic environment setting information for each weblog server group, and
the user-setting editing unit references the stored basic environment setting information to update the environment setting information stored in the weblogs environment-settings storage unit.

10. A read-image transfer system comprising:
a read-image transfer apparatus that is connected to an image reader and that includes a memory and a controller;
an information communication terminal that includes a memory, a controller, a display unit, and an input unit; and
a weblog server, all of which being communicably connected to each other via a network to form the read-image transfer system, wherein
the memory of the read-image transfer apparatus includes
a user-setting-information storage unit that stores therein at least destination address information for the weblog server, a transfer protocol for the weblog server, and user identification information for causing the weblog server to identify a user, and
the controller of the read-image transfer apparatus includes
an image reading unit that controls the image reader so as to read image information from a document;
a read-image storing unit that stores the read image information in the memory of the read-image transfer apparatus;
an email-with-image sending unit that sends an email with the image information stored by the read-image storing unit to the information communication terminal; and
an image transferring unit that transfers the image information stored by the read-image storing unit, to the weblog server based on the user setting information stored in the user-setting-information storage unit, and
the controller of the information communication terminal includes
a read-image displaying unit that causes the display unit of the information communication terminal to display thereon the image information sent by the email-with-image sending unit;
a posting confirming unit that prompts the user to enter an instruction whether the image information transferred by the image transferring unit corresponding to the displayed image information is to be posted on a weblog, through the input unit; and
a posting-instruction transmitting unit that transmits posting instruction information to the weblog server, when the posting confirming unit confirms that the instruction to post the image information is entered by the user, the posting instruction information being used to control the weblog server so that the transferred image information is posted on the weblog.

11. The read-image transfer system according to claim 10, wherein the memory of the read-image transfer apparatus further includes
a weblogs environment-settings storage unit that stores therein the destination address information or the transfer protocol as environment setting information for each weblog server group, and
the controller of the read-image transfer apparatus further includes
a user-setting editing unit that prompts the user to enter information for the weblog server through the input unit, sets the environment setting information corresponding to the weblog server as the user setting information based on the environment setting information stored in the weblogs environment-settings storage unit, and stores the set environment setting information in the user-setting-information storage unit.

12. The read-image transfer system according to claim 10, wherein the email-with-image sending unit sends the email with the image information attached, of which image size is reduced.

13. The read-image transfer system according to claim 10, wherein the user setting information further includes
image posting format information for the weblog server, and
the read-image storing unit stores the read image information in the memory by being converted so as to coincide with the image posting format of the weblog server based on the image posting format information stored in the user-setting-information storage unit.

14. The read-image transfer system according to claim 10, wherein the controller of the read-image transfer apparatus further includes a character recognizing unit that recognizes a character, a symbol, or a graphic in the image information to acquire information such as character therefrom.

15. The read-image transfer system according to claim 14, wherein the user-setting editing unit edits the user setting information based on the information such as character acquired by the character recognizing unit.

16. The read-image transfer system according to claim 10, wherein the read-image transfer apparatus is further connected to an infrared communication device,
the controller of the read-image transfer apparatus further includes
an infrared communicating unit that controls the infrared communication device to perform infrared communication through which any one of user identification information and email address information or both are acquired; and
a user-information storing unit that stores the acquired either one of user identification information and email address information or the both in the memory of the read-image transfer apparatus, and
the email-with-image sending unit sends the email to the information communication terminal using either one of the stored email address corresponding to the acquired user ID and the acquired email address, as a destination.

17. The read-image transfer system according to claim 10, wherein the read-image transfer apparatus is further connected to an integrated circuit (IC) card reader,
the controller of the read-image transfer apparatus further includes
an IC-card payment controlling unit that controls IC-card payment through the IC card reader, and
when payment is made by the IC card through the IC-card payment controlling unit, the email-with-image sending unit sends the email with the stored image information to the information communication terminal.

18. The read-image transfer system according to claim 10, further comprising:
a weblog management server that includes a memory, wherein
the memory of the weblog management server includes
a weblog-management basic-information storage unit that stores therein the destination address information, the transfer protocol, or the image posting format information as basic environment setting information for each weblog server group, and
the user-setting editing unit references the stored basic environment setting information via the network to update the environment setting information stored in the weblogs environment-settings storage unit.

19. The read-image transfer system according to claim 10, wherein the memory of the read-image transfer apparatus further includes
an email-notification-list storage unit that stores therein email address information for the user in association with the user identification information, and
the controller of the read-image transfer apparatus further includes
an email notifying unit that receives posting success/failure information on whether the transferred image information is successfully posted on the weblog, from the weblog server, and sends an email notifying the user of the posting success/failure information to the email address as a destination corresponding to the user identification information stored in the email-notification-list storage unit.

20. The read-image transfer system according to claim 10, wherein the information communication terminal further includes an output unit, and
the controller of the information communication terminal further includes
a posting success/failure information outputting unit that receives the posting success/failure information on whether the transferred image information is successfully posted on the weblog from either one of the weblog server and the read-image transfer apparatus, and outputs the posting success/failure information to the output unit.

21. A read-image transfer system comprising:
a read-image transfer apparatus that is connected to an image reader and that includes a memory and a controller;
an information communication terminal that includes a memory, a controller, a display unit, and an input unit; and
a weblog server, all of which being communicably connected to each other via a network to form the read-image transfer system, wherein
the controller of the read-image transfer apparatus includes
an image reading unit that controls the image reader so as to read image information from a document;
a read-image storing unit that stores the read image information in the memory of the read-image transfer apparatus; and
an email-with-image sending unit that sends an email with the stored image information to the information communication terminal,
the memory of the information communication terminal includes
a user-setting-information storage unit that stores therein user setting information including at least destination address information for the weblog server, a transfer protocol for the weblog server, and user identification information for causing the weblog server to identify a user, and
the controller of the information communication terminal includes
a read-image displaying unit that causes the display unit of the information communication terminal to display thereon the image information sent by the email-with-image sending unit;
a transfer confirming unit that prompts the user to enter an instruction whether displayed image information is to be transferred to the weblog server, through the input unit; and
an image transferring unit that transfers the image information stored by the read-image storing unit to the weblog server, when the transfer confirming unit confirms that the instruction to transfer the image information is entered by the user, based on the user setting information stored in the user-setting-information storage unit.

22. The read-image transfer system according to claim 21, wherein
the memory of the information communication terminal further includes
a weblogs environment-settings storage unit that stores therein the destination address information or the transfer protocol as environment setting information for each weblog server group, and
the controller of the information communication terminal further includes
a user-setting editing unit that prompts the user to enter information for the weblog server through the input unit, sets the environment setting information corresponding to the weblog server as the user setting information based on the stored environment setting information, and stores the set environment setting information in the user-setting-information storage unit.

23. The read-image transfer system according to claim 21, wherein the user setting information further includes
image posting format information for the weblog server, and
the read-image storing unit stores the read image information in the memory by being converted so as to coincide with the image posting format of the weblog server based on the image posting format information stored in the user-setting-information storage unit.

24. The read-image transfer system according to claim 21, wherein the controller of the read-image transfer apparatus further includes a character recognizing unit that recognizes a character, a symbol, or a graphic in the image information to acquire information such as character therefrom.

25. The read-image transfer system according to claim 21, wherein the user-setting editing unit edits the user setting information based on the information such as character acquired by the character recognizing unit.

26. The read-image transfer system according to claim 21, wherein the read-image transfer apparatus is further connected to an infrared communication device,
the controller of the read-image transfer apparatus further includes
an infrared communicating unit that controls the infrared communication device to perform infrared communication through which any one of user identification information and email address information or both are acquired; and a user-information storing unit that stores the acquired either one of user identification information and email address information or the both in the memory of the read-image transfer apparatus, and the email-with-image sending unit sends the email to the information communication terminal using either one of the stored email address corresponding to the acquired user ID and the acquired email address, as a destination.

27. The read-image transfer system according to claim 21, wherein the read-image transfer apparatus is further connected to an integrated circuit (IC) card reader, the controller of the read-image transfer apparatus further includes an IC-card payment controlling unit that controls IC-card payment through the IC card reader, and when payment is made by the IC card through the IC-card payment controlling unit, the email-with-image sending unit sends the email with the stored image information to the information communication terminal.

28. The read-image transfer system according to claim 21, further comprising:

a weblog management server that includes a memory, wherein the memory of the weblog management server includes a weblog-management basic-information storage unit that stores therein the destination address information, the transfer protocol, or the image posting format information as basic environment setting information for each weblog server group, and the user-setting editing unit references the stored basic environment setting information via the network to update the environment setting information stored in the weblogs environment-settings storage unit.

29. The read-image transfer system according to claim 21, wherein the memory of the read-image transfer apparatus further includes an email-notification-list storage unit that stores therein email address information for the user in association with the user identification information, and the controller of the read-image transfer apparatus further includes an email notifying unit that receives posting success/failure information on whether the transferred image information is successfully posted on the weblog, from the weblog server, and sends an email notifying the user of the posting success/failure information to the email address as a destination corresponding to the user identification information stored in the email-notification-list storage unit.

30. The read-image transfer system according to claim 21, wherein the information communication terminal further includes an output unit, and the controller of the information communication terminal further includes a posting success/failure information outputting unit that receives the posting success/failure information on whether the transferred image information is successfully posted on the weblog from either one of the weblog server and the read-image transfer apparatus, and outputs the posting success/failure information to the output unit.

31. A read-image transfer method executed in a read-image transfer apparatus that is connected to an image reader and to a weblog server via a network and that includes a memory and a controller, wherein the memory includes a user-setting-information storage unit that stores therein user setting information including at least destination address information for the weblog server, a transfer protocol for the weblog server, and user identification information for causing the weblog server to identify a user, the read-image transfer method executed in the controller comprising:

an image reading step of reading image information from a document by controlling the image reader;

a read-image storing step of storing the read image information in the memory; and an image transferring step of transferring the image information stored at the read-image storing step to the weblog server based on the user setting information stored in the user-setting-information storage unit.

32. A read-image transfer method executed in a read-image transfer system that includes a read-image transfer apparatus that is connected to an image reader and includes a memory and a controller; and an information communication terminal that includes a memory, a controller, a display unit, and an input unit, both of which being connected to a weblog server via a network to form the read-image transfer system, wherein the memory of the read-image transfer apparatus includes a user-setting-information storage unit that stores therein user setting information including at least destination address information for the weblog server, a transfer protocol for the weblog server, and user identification information for causing the weblog server to identify a user, the read-image transfer method executed in the controller of the read-image transfer apparatus comprising:

a image reading step of reading image information from a document by controlling the image reader;

a read-image storing step of storing the read image information in the memory of the read-image transfer apparatus;

a email-with-image sending step of sending an email with the stored image information to the information communication terminal; and a image transferring step of transferring the stored image information to the weblog server based on the user setting information stored in the user-setting-information storage unit, and the read-image transfer method executed in the controller of the information communication terminal comprising:

a read-image displaying step of controlling the display unit of the information communication terminal so as to display thereon the image information sent at the email-with-image sending step;

a posting confirming step of prompting the user to enter an instruction whether the transferred image information corresponding to the displayed image information is to be posted on the weblog, through the input unit; and a posting-instruction transmitting step of transmitting posting instruction information to the weblog server, when it is confirmed that the instruction to post the image information is entered by the user at the posting confirming step, the posting instruction information being used to control the weblog server so that the transferred image information is posted on the weblog.

33. A read-image transfer method executed in a read-image transfer system that includes
a read-image transfer apparatus that is connected to an image reader and includes a memory and a controller; and
an information communication terminal that includes a memory, a controller, a display unit, and an input unit, both of which being connected to a weblog server via a network to form the read-image transfer system, wherein
the memory of the information communication terminal includes
a user-setting-information storage unit that stores therein user setting information including at least destination address information for the weblog server, a transfer protocol for the weblog server, and user identification information for causing the weblog server to identify a user,
the read-image transfer method executed in the controller of the read-image transfer apparatus comprising:
an image reading step of reading image information from a document by controlling the image reader;
a read-image storing step of storing the read image information in the memory of the read-image transfer apparatus;
an email-with-image sending step of sending an email with the stored image information to the information communication terminal; and
the controller of the information communication terminal includes
a read-image displaying step of causing the display unit of the information communication terminal to display thereon the image information sent at the email-with-image sending step;
a transfer confirming step of prompting the user to enter an instruction whether the displayed image information is to be transferred to the weblog server, through the input unit; and
an image transferring step of transferring the image information stored at the read-image storing step to the weblog server, when it is confirmed that the instruction to transfer the image information is entered by the user at the transfer confirming step, based on the user setting information stored in the user-setting-information storage unit.

34. A non-transitory computer-readable recording medium that stores therein a computer program causing a read-image transfer apparatus to execute a read-image transfer method, the read-image transfer apparatus connected to an image reader and to a weblog server via a network, including a memory and a controller, wherein the memory includes a user-setting-information storage unit that stores therein user setting information including at least destination address information for the weblog server, a transfer protocol for the weblog server, and user identification information for causing the weblog server to identify a user,
the read-image transfer method executed in the controller comprising:
an image reading step of controlling the image reader so as to read image information from a document;
a read-image storing step of storing the read image information in the memory; and
an image transferring step of transferring the image information stored at the read-image storing step to the weblog server, based on the user setting information stored in the user-setting-information storage unit.

35. A sheet for causing a read-image transfer apparatus connected a weblog server via a network to read image information through an image reader, wherein at least one of destination address information for the weblog server, a transfer protocol for the weblog server, and user identification information for causing the weblog server to identify a user is provided on the sheet so as to be read by the read-image transfer apparatus.

36. A sheet for causing a read-image transfer apparatus connected a weblog server via a network to read image information through an image reader provided with a radio communication unit, the sheet comprising:
a memory transmission unit that stores therein at least one of destination address information for the weblog server, a transfer protocol for the weblog server, and user identification information for causing the weblog server to identify a user, and transmits at least one of the stored information to the read-image transfer apparatus via the radio communication unit.

37. A carrier sheet for carrying a document to an image reader to cause a read-image transfer apparatus connected a weblog server via a network to read image information from the document through the image reader, the carrier sheet comprising:
a transparent sheet; and
a backing sheet, wherein at least one sides of the transparent sheet and the backing sheet are fixed so that the document is capable of being inserted between the transparent sheet and the backing sheet, and
at least one of destination address information for the weblog server, a transfer protocol for the weblog server, and user identification information for causing the weblog server to identify a user is provided on at least one of the transparent sheet and the backing sheet so as to be read by the read-image transfer apparatus.

38. A carrier sheet for carrying a document to an image reader provided with a radio communication unit to cause a read-image transfer apparatus connected a weblog server via a network to read image information from the document through the image reader, the carrier sheet comprising:
a transparent sheet;
a backing sheet, wherein at least one sides of the transparent sheet and the backing sheet are fixed so that the document is capable of being inserted between the transparent sheet and the backing sheet; and
a memory transmission unit that stores therein at least one of destination address information for the weblog server, a transfer protocol for the weblog server, and user identification information for causing the weblog server to identify a user, and transmits at least one of the stored information to the read-image transfer apparatus via the radio communication unit.

* * * * *